(12) United States Patent
Duté et al.

(10) Patent No.: US 7,912,562 B2
(45) Date of Patent: Mar. 22, 2011

(54) SYSTEM, DEVICE AND METHOD FOR COMPREHENSIVE INPUT/OUTPUT INTERFACE BETWEEN PROCESS OR MACHINE TRANSDUCERS AND CONTROLLING DEVICE OR SYSTEM

(75) Inventors: John C. Duté, Concord, MI (US); Laurence A. Boyd, II, Brooklyn, MI (US); Donald P. Woolworth, Jackson, MI (US)

(73) Assignee: Electronic Solutions, Inc., Northwood, OH (US)

( * ) Notice: Subject to any disclaimer, the term of this patent is extended or adjusted under 35 U.S.C. 154(b) by 1825 days.

(21) Appl. No.: 09/915,188

(22) Filed: Jul. 25, 2001

(65) Prior Publication Data

US 2002/0082725 A1 Jun. 27, 2002

Related U.S. Application Data

(60) Provisional application No. 60/220,545, filed on Jul. 25, 2000.

(51) Int. Cl.
*G05B 13/02* (2006.01)
(52) U.S. Cl. ............... 700/51; 702/189; 700/11
(58) Field of Classification Search ............... 710/8, 12, 710/14, 62, 63, 65; 700/6, 7, 75, 51, 11; 702/189
See application file for complete search history.

(56) References Cited

U.S. PATENT DOCUMENTS

| | | | |
|---|---|---|---|
| 4,121,183 A | | 10/1978 | Murphy |
| 4,267,439 A | * | 5/1981 | Thomas et al. ............... 235/454 |
| 4,275,307 A | | 6/1981 | Struger et al. |
| 4,278,916 A | * | 7/1981 | Regan et al. ............... 315/92 |
| 4,293,924 A | | 10/1981 | Struger et al. |
| 4,374,333 A | * | 2/1983 | Avery ............... 327/77 |
| 4,378,502 A | | 3/1983 | Clarke |
| 4,404,473 A | | 9/1983 | Fox |
| 4,480,312 A | * | 10/1984 | Wingate ............... 702/130 |
| 4,500,845 A | | 2/1985 | Ehni |
| 4,560,936 A | | 12/1985 | Pelowski |
| 4,593,380 A | * | 6/1986 | Kocher et al. ............... 710/31 |
| 4,638,850 A | * | 1/1987 | Newell et al. ............... 165/255 |
| 4,697,107 A | | 9/1987 | Haines |
| 4,771,403 A | | 9/1988 | Maskovyak et al. |
| 4,855,905 A | * | 8/1989 | Estrada et al. ............... 709/246 |
| 4,890,013 A | * | 12/1989 | Arcus ............... 327/53 |
| 4,896,288 A | | 1/1990 | Gonnering et al. |
| 4,910,659 A | * | 3/1990 | Gates et al. ............... 700/21 |
| 4,914,542 A | | 4/1990 | Wagoner |
| 5,014,238 A | * | 5/1991 | McLeish et al. ............... 702/189 |
| 5,043,861 A | * | 8/1991 | Diekhans et al. ............... 700/11 |
| 5,079,455 A | | 1/1992 | McCafferty et al. |
| 5,111,070 A | | 5/1992 | Murphy et al. |

(Continued)

*Primary Examiner* — Jungwon Chang
(74) *Attorney, Agent, or Firm* — Marshall & Melhorn, LLC

(57) ABSTRACT

Comprehensive universal configurable interface for electrical, electronic, and electromechanical control, sensing, and actuation. Circuit, apparatus, method, and signal set for interfacing an electrical or electronic component or a mechanical component generating or effecting an electrical or electronic signal to a control system or device. Comprehensive universal input/output interface system, circuit, and method for interfacing such components and control systems that send or receive analog or digital voltage and/or current inputs over a large range of voltages and/or current without hardware or software switches. Interface and method includes and needs only two terminals for the connection of sensor or actuator. Provides plurality of operation mode circuits to accomplish the following functions: digital input, digital output, analog input, analog output, and others. Supports either voltage or current input and output, and voltage and current capabilities over a broad dynamic range. Single physical package for user configuration into a broad set of applications.

5 Claims, 14 Drawing Sheets

U.S. PATENT DOCUMENTS

| | | | | |
|---|---|---|---|---|
| 5,210,846 | A | 5/1993 | Lee | |
| 5,233,309 | A | 8/1993 | Spitalny et al. | |
| 5,264,958 | A * | 11/1993 | Johnson | 710/315 |
| 5,469,150 | A * | 11/1995 | Sitte | 340/3.42 |
| 5,486,791 | A | 1/1996 | Spitalny et al. | |
| 5,537,285 | A | 7/1996 | Jenets et al. | |
| 5,727,170 | A * | 3/1998 | Mitchell et al. | 710/105 |
| 5,729,547 | A | 3/1998 | Dute | |
| 5,757,680 | A * | 5/1998 | Boston et al. | 702/121 |
| 5,793,993 | A * | 8/1998 | Broedner et al. | 710/106 |
| 6,115,654 | A * | 9/2000 | Eid et al. | 701/34 |
| 6,144,888 | A * | 11/2000 | Lucas et al. | 700/83 |
| 6,154,680 | A * | 11/2000 | White et al. | 700/19 |
| 6,166,525 | A * | 12/2000 | Crook | 322/11 |
| 6,206,482 | B1 * | 3/2001 | Campau et al. | 303/20 |
| 6,208,497 | B1 * | 3/2001 | Seale et al. | 361/160 |
| 6,308,231 | B1 * | 10/2001 | Galecki et al. | 710/72 |
| 6,334,352 | B1 * | 1/2002 | Poggio et al. | 73/23.31 |

* cited by examiner

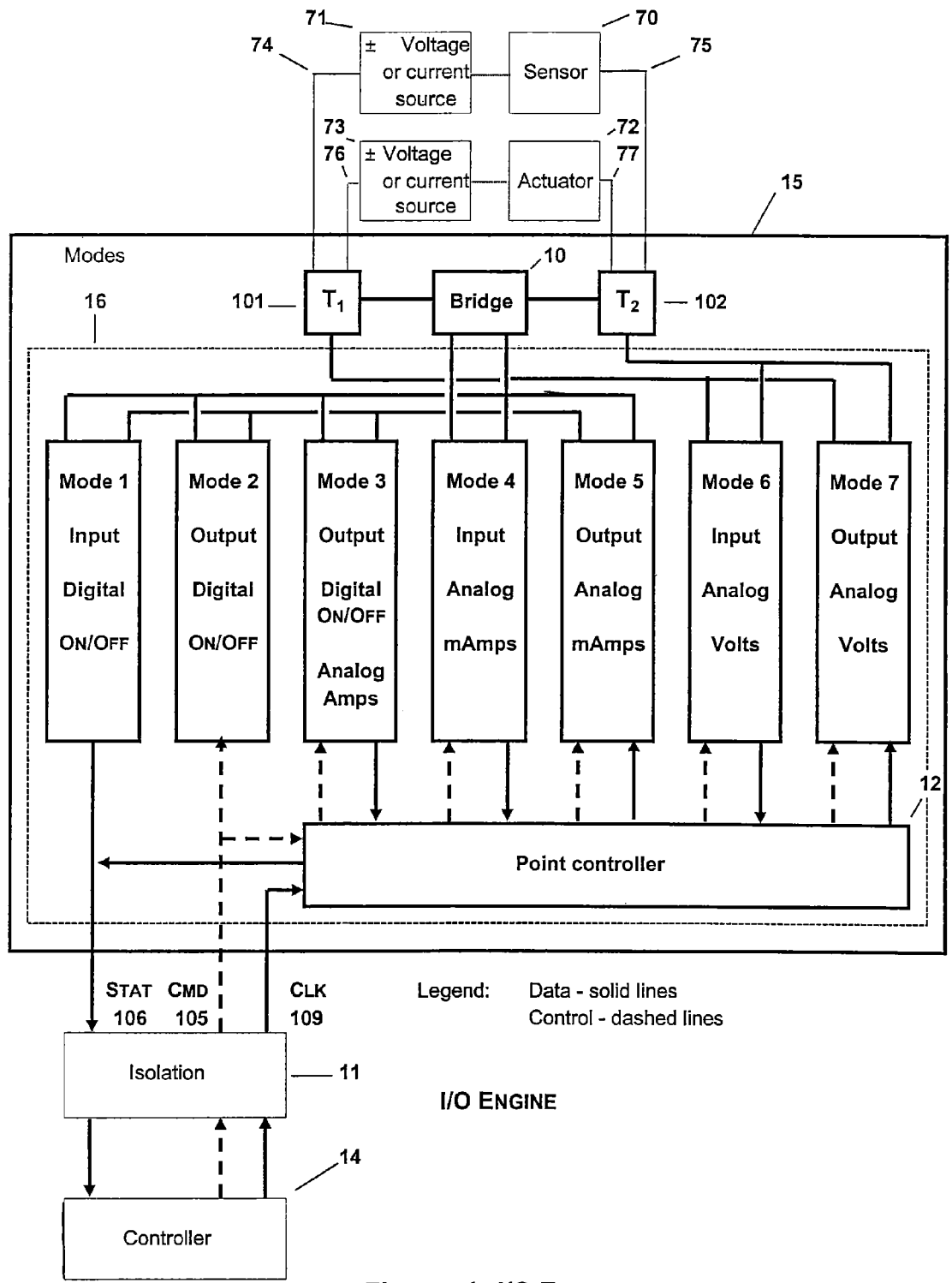
Figure 1 I/O ENGINE

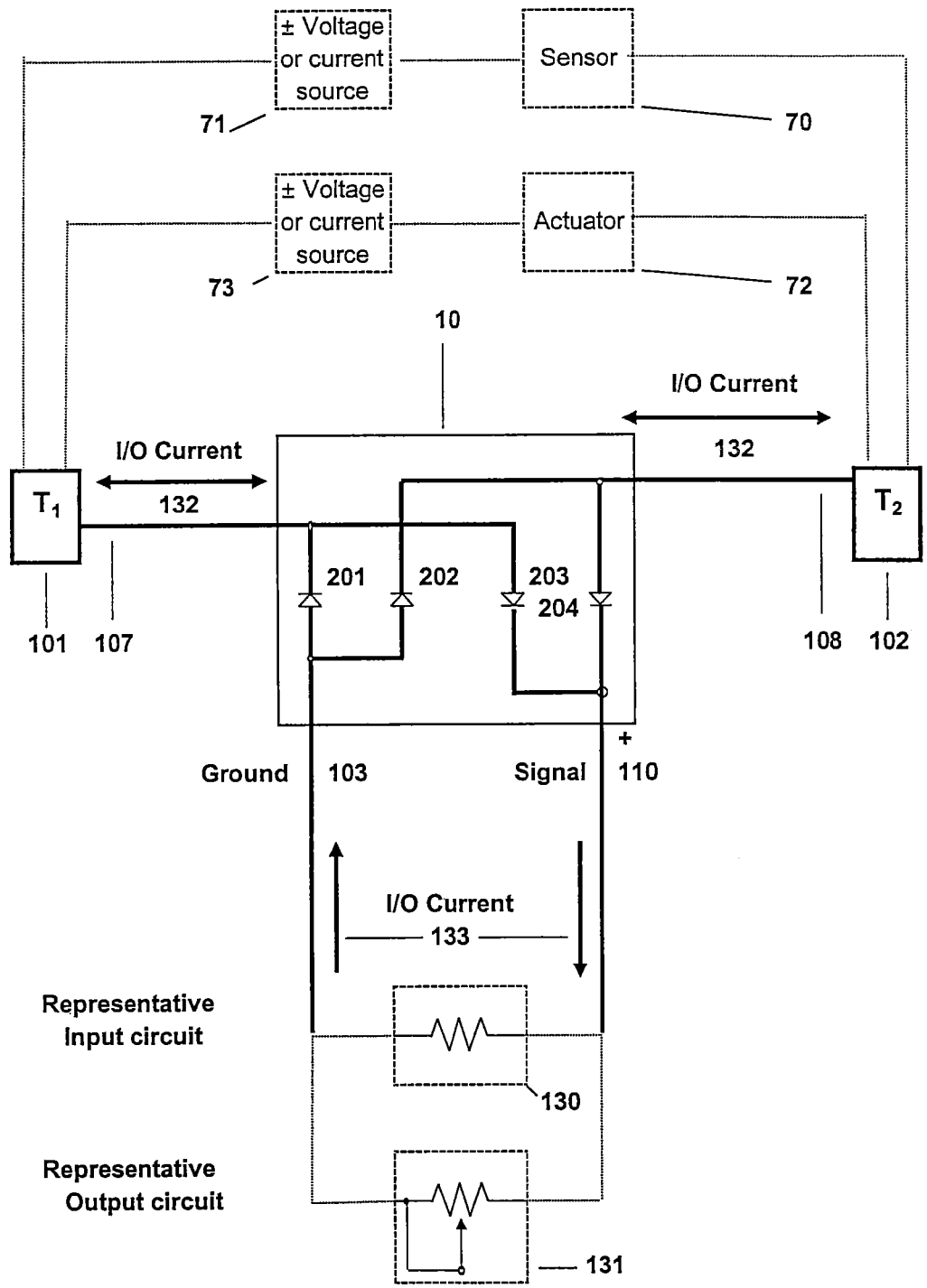
Figure 2 Senso-Actuator Connections

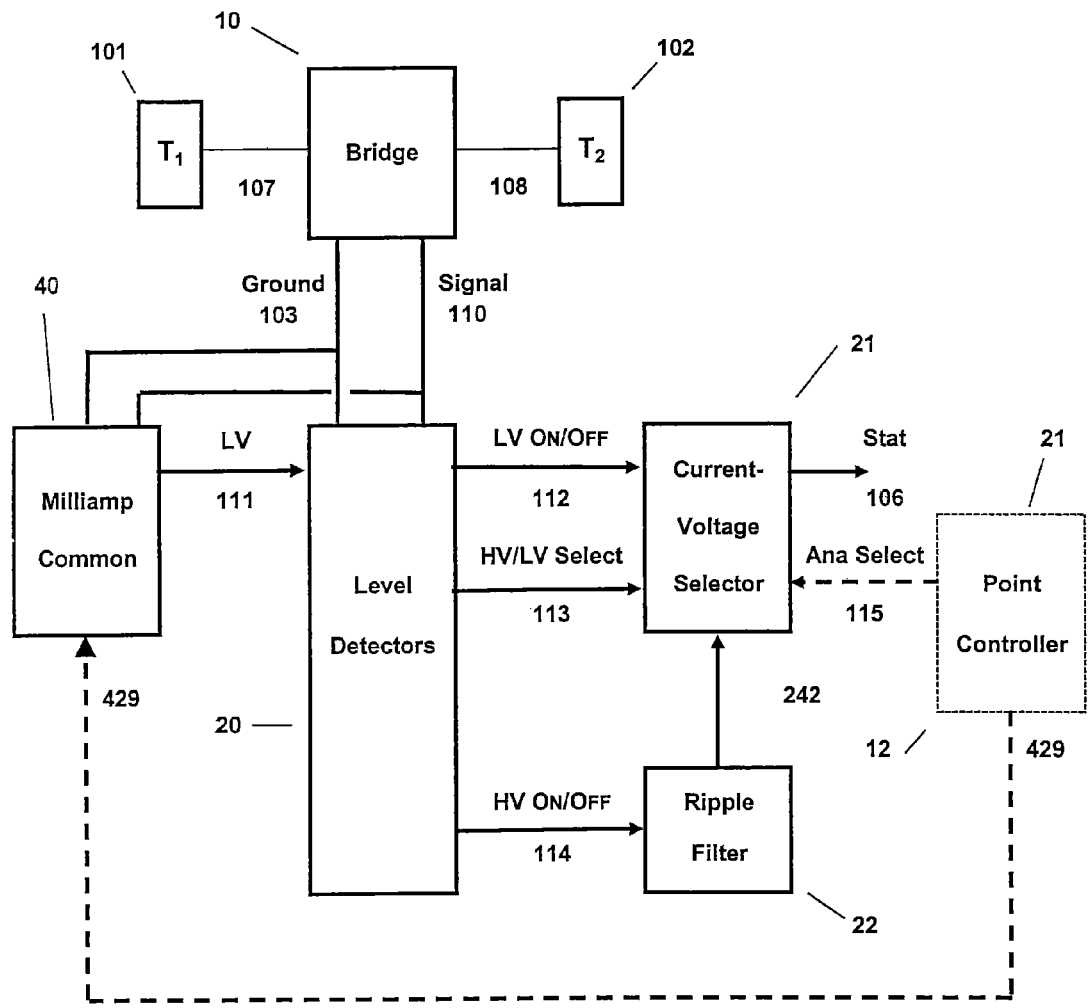
Figure 3 Mode 1 Digital (ON/OFF) Input

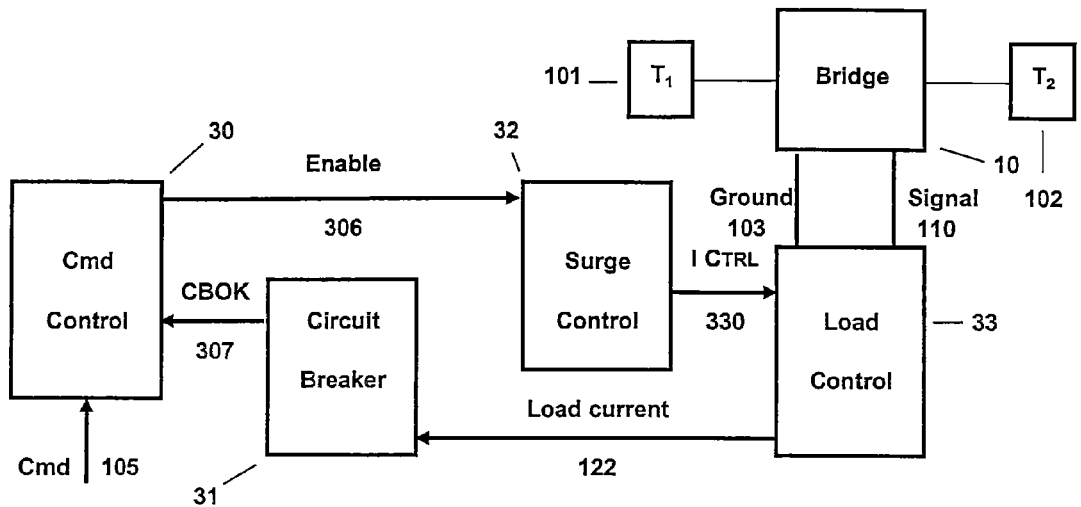
Figure 4  Mode 2 Digital (ON/OFF) Output
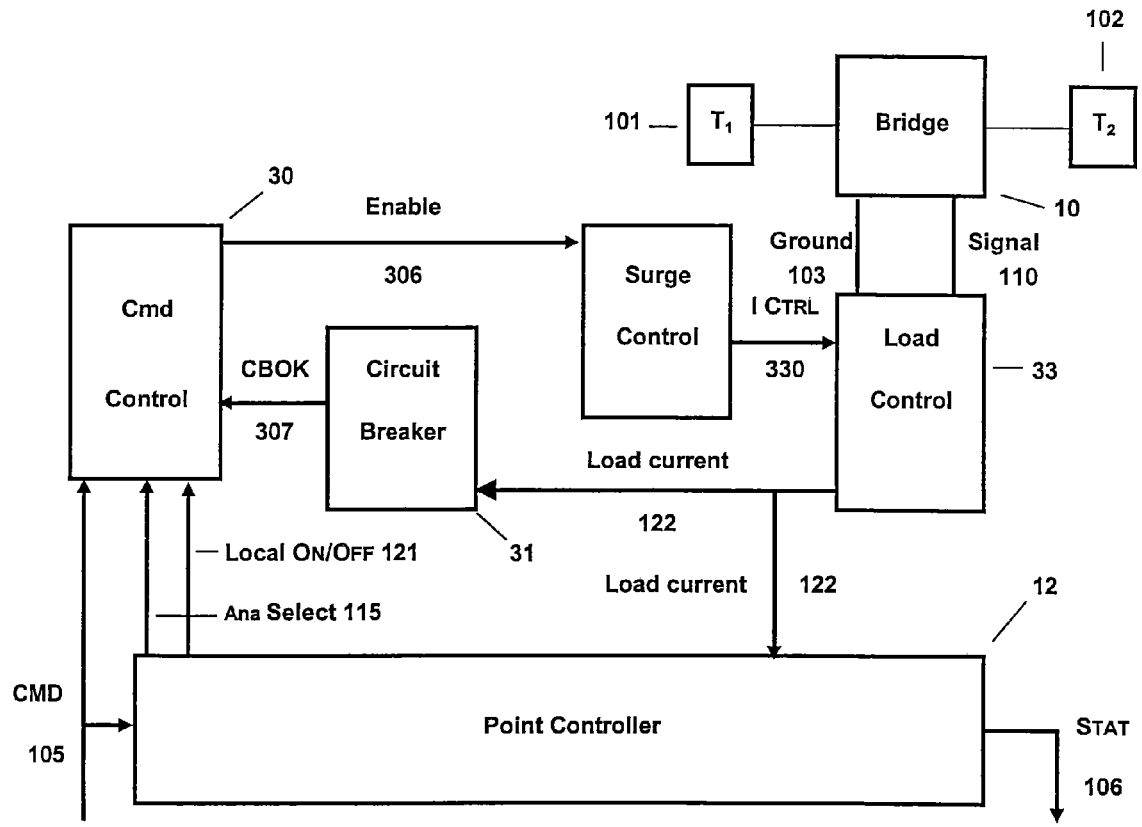
Figure 5  Mode 3 Digital Output & Load Current

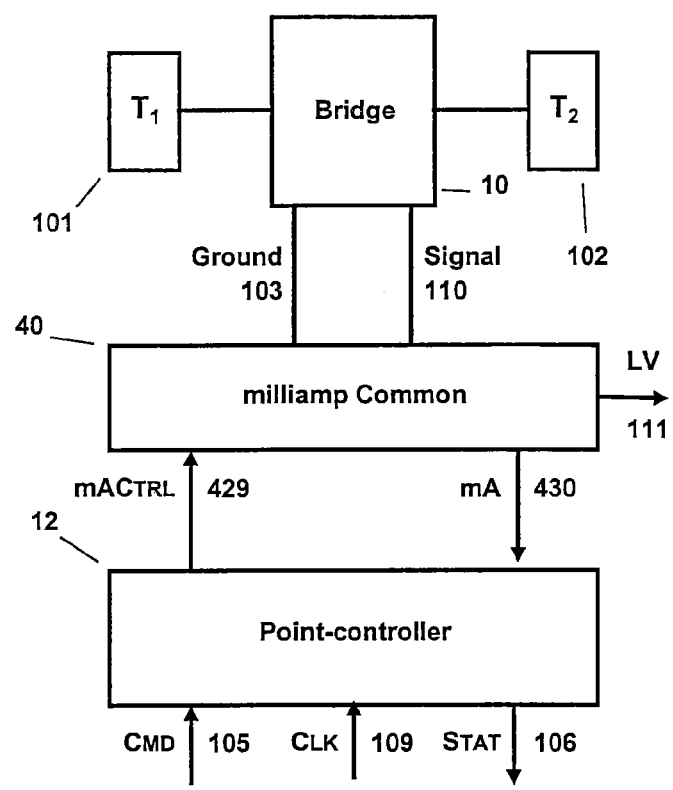
Figure 6  Modes 4 & 5  mA Functions

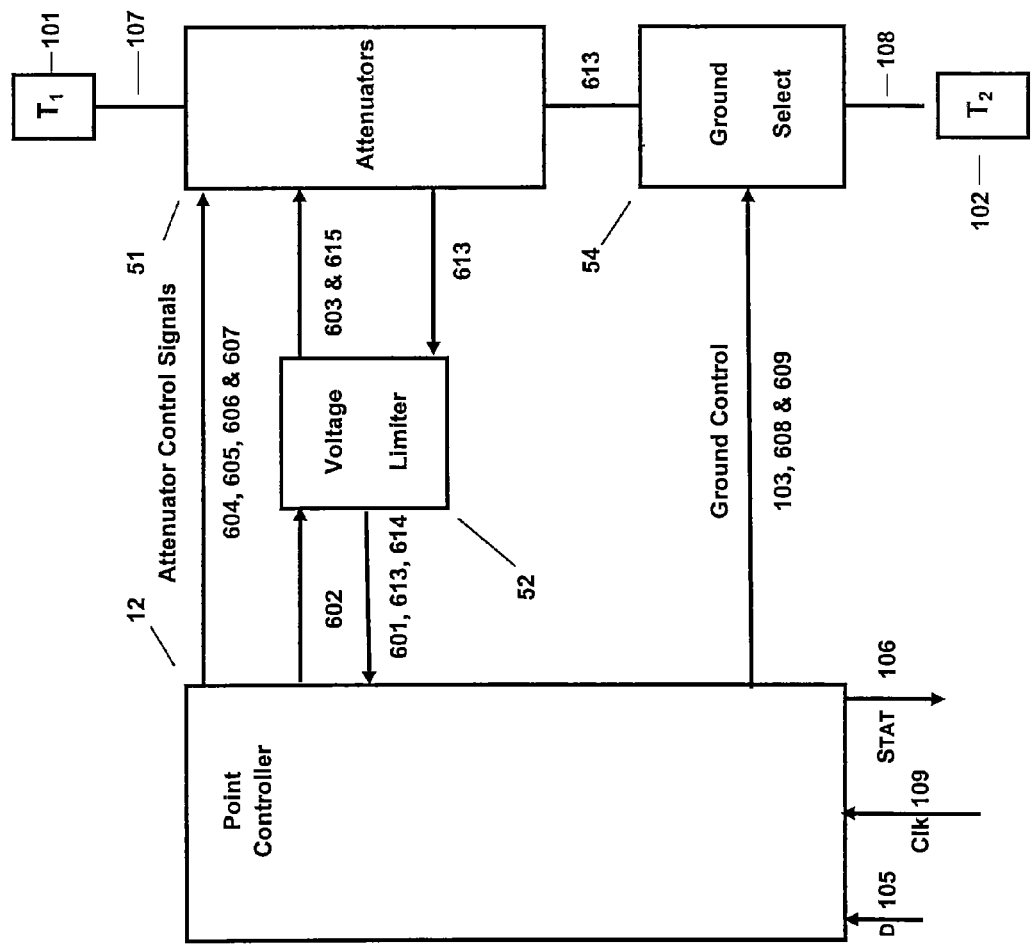
Figure 7    Mode 6: Analog Voltage Input

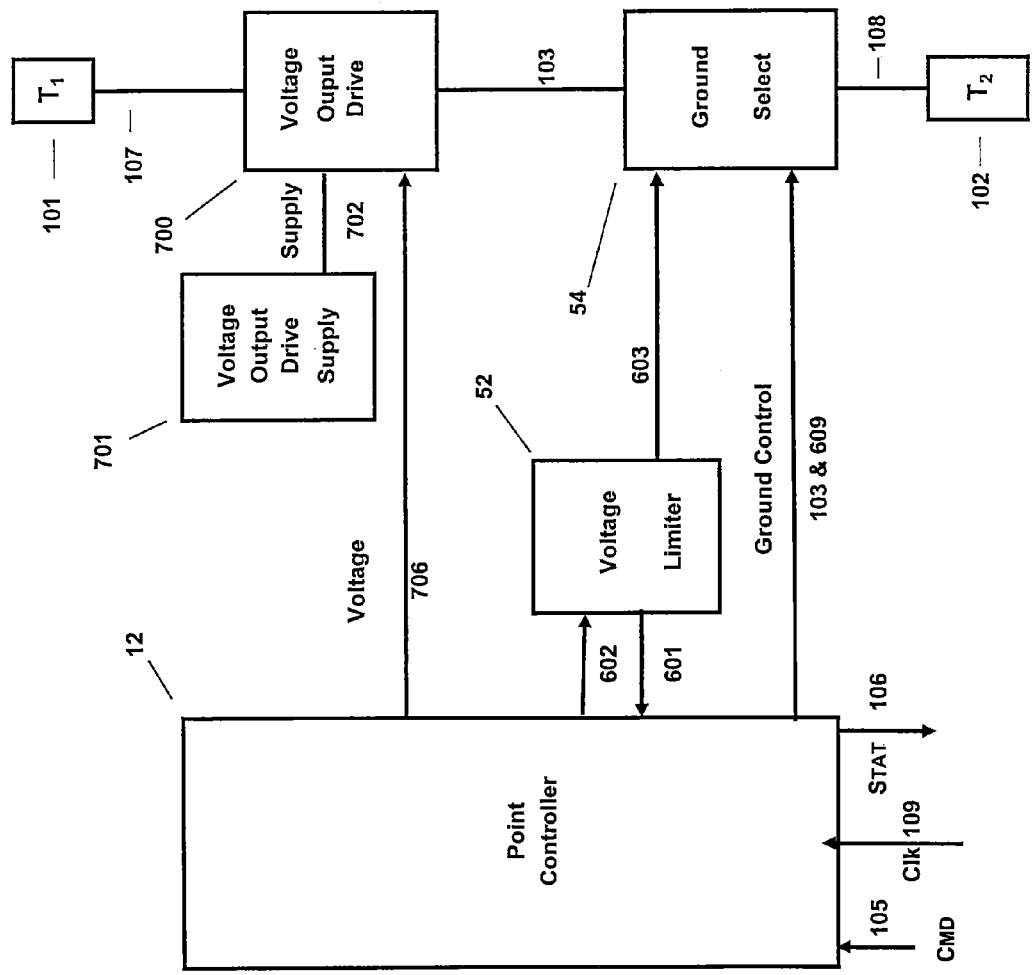
Figure 8   Mode 7: Analog Voltage Output

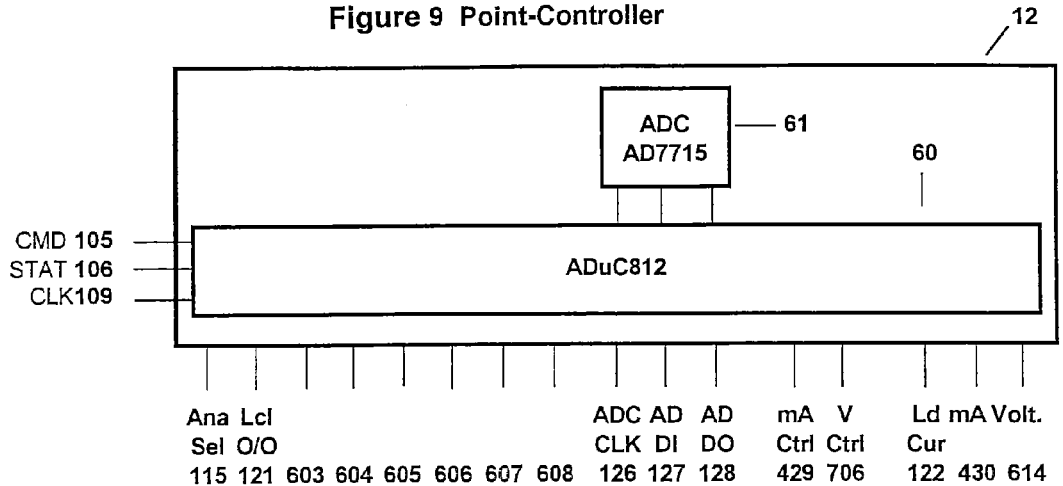

Figure 9 Point-Controller

Ana Sel 115 | Lcl O/O 121 | 603 604 605 606 607 608 | ADC CLK 126 | AD DI 127 | AD DO 128 | mA Ctrl 429 | V Ctrl 706 | Ld Cur 122 | mA 430 | Volt. 614

| Mode | REF # | I/O | | 1 | 2 | 3 | 4 | 5 | 6 | 7 | 8 | 9 | 10 | 11 | DAC 1 | DAC 2 | ADC 1 | ADC 2 | ADC 3 |
|---|---|---|---|---|---|---|---|---|---|---|---|---|---|---|---|---|---|---|---|
| 1 | I | D | ON/OFF | H | T | L | L | L | L | L | L | T | T | T | T | T | - | - | - |
| 2 | O | D | ON/OFF | H | T | L | L | L | L | L | L | T | T | T | T | T | - | - | - |
| 3 | O | D,A | Amps | L | H/L | L | L | L | L | L | L | T | T | T | T | T | Amps | - | - |
| 4 | I | A | mAmp | L | L | L | L | L | L | L | L | T | T | T | 5 | T | - | mA | - |
| 5 | O | A | mAmp | L | L | L | L | L | L | L | L | T | T | T | 0-2.5 | T | - | mA | - |
| 6a | I | A | Volts LV dc | L | L | L | L | H | L | H | L | CLK | DI | DO | T | T | - | - | V |
| 6b | I | A | Volts HV dc | L | L | L | H | L | H | H | L | CLK | DI | DO | T | T | - | - | V |
| 6c | I | A | Volts HV ac | L | L | H | L | L | H | H | L | CLK | DI | DO | T | T | - | - | V |
| 7 | O | A | Volts | L | L | L | L | H | L | H | H | CLK | DI | DO | T | 0-2.5 | - | - | V |

L = low    H = High    T = Tri-state

Figure 10 Mode Control Table

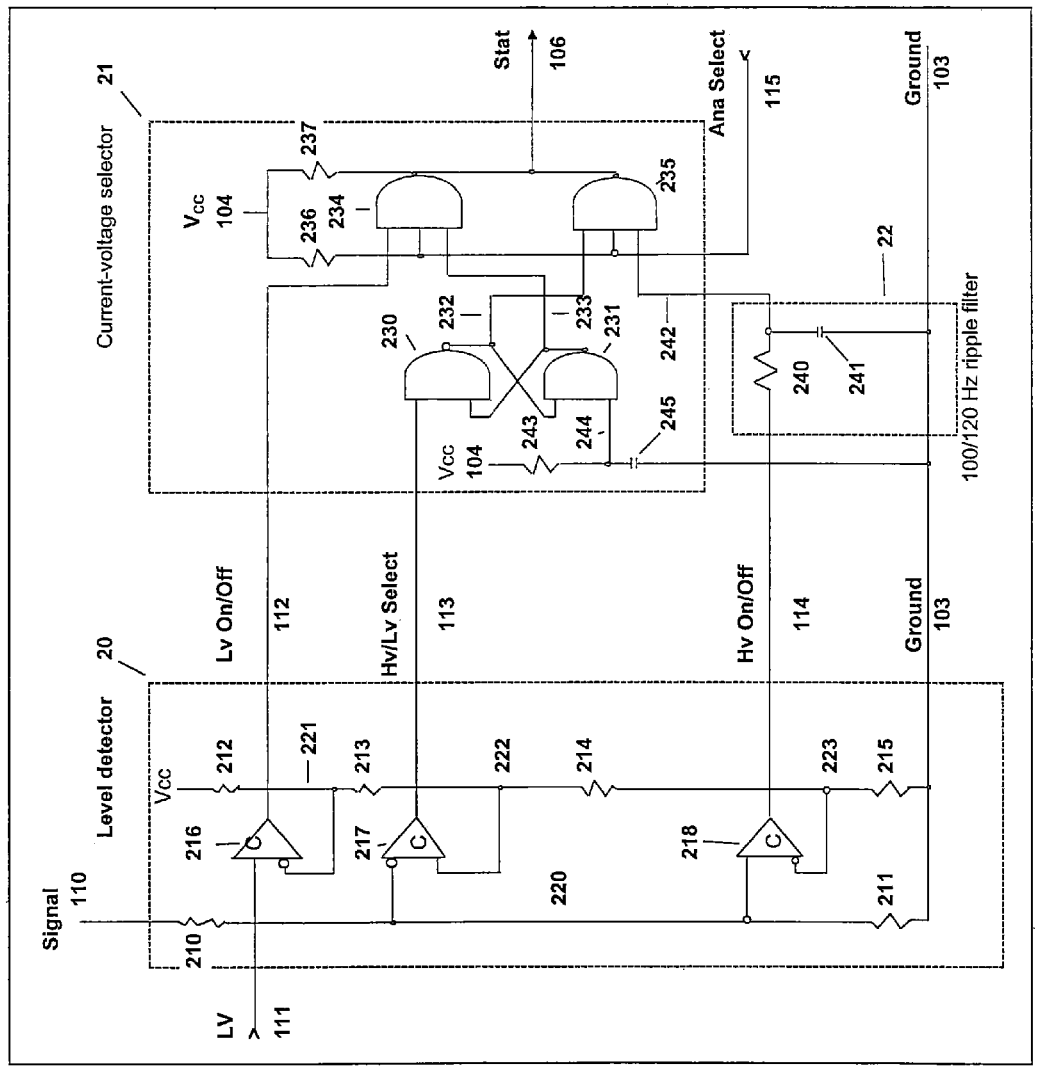
Figure 11 Mode 1 Digital (ON/OFF) Inputs

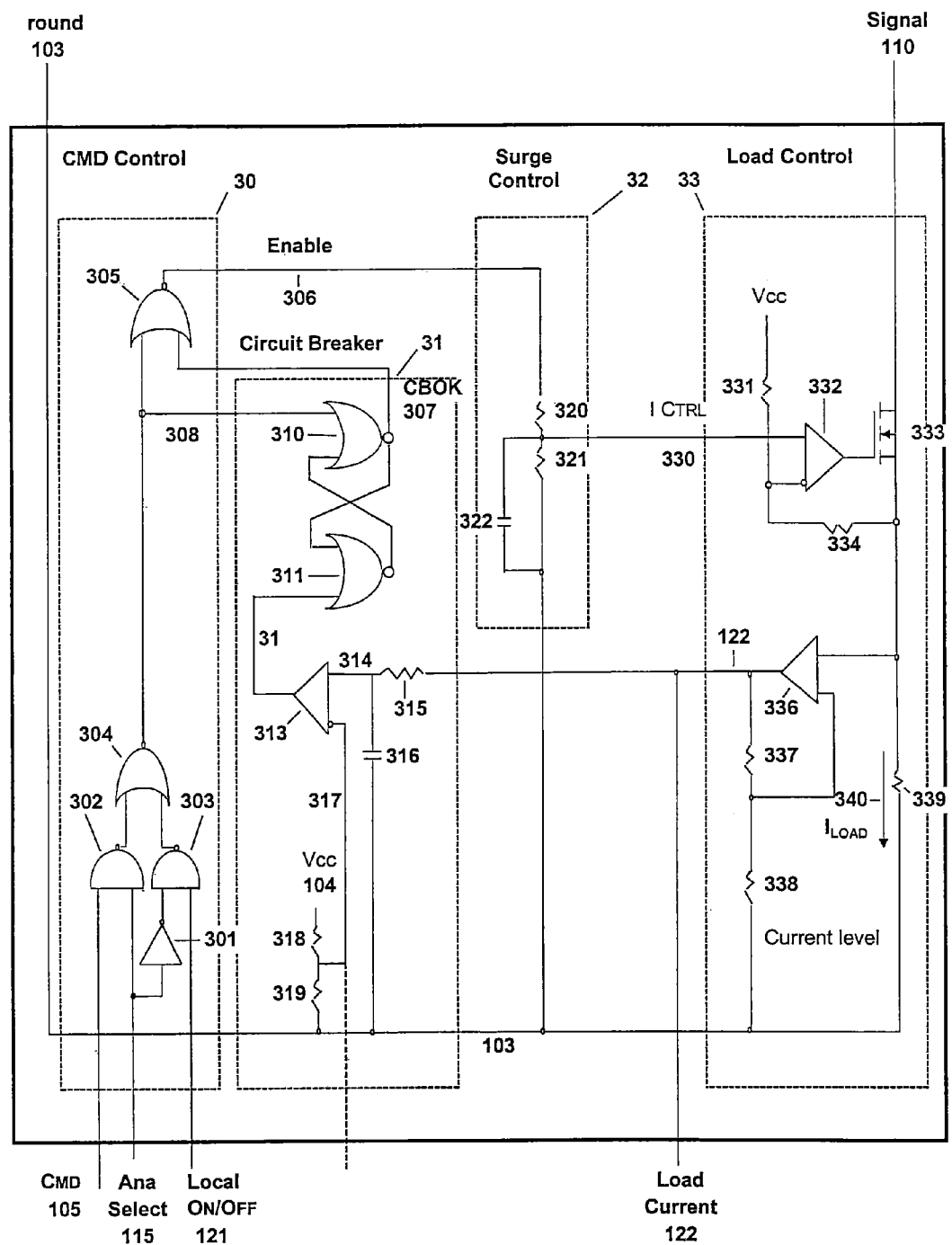
Figure 12 Mode2: Digital (ON/OFF) Output; Mode 3: Load Current

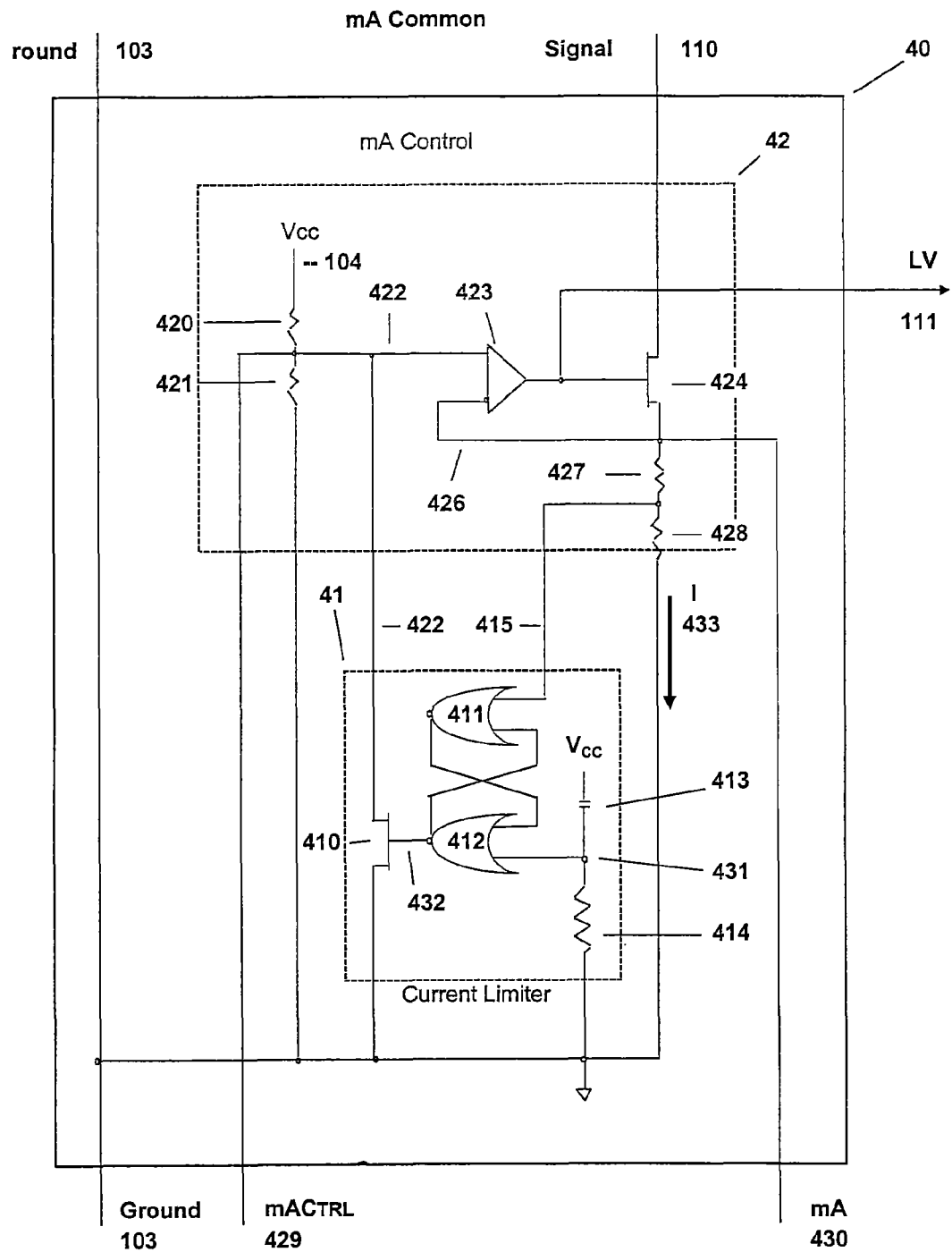
Figure 13 Modes 4 & 5: mA Common

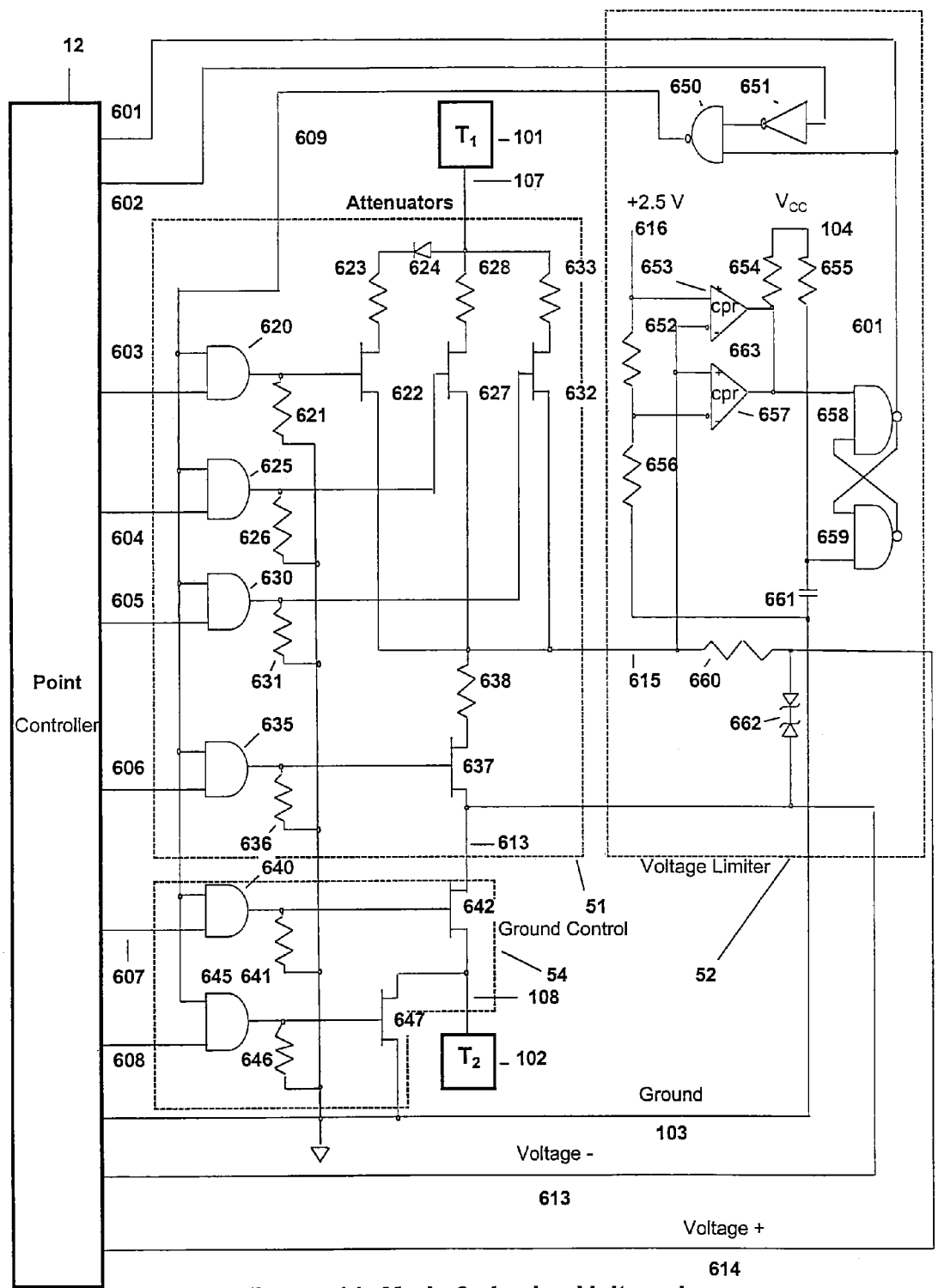
Figure 14 Mode 6: Analog Voltage In

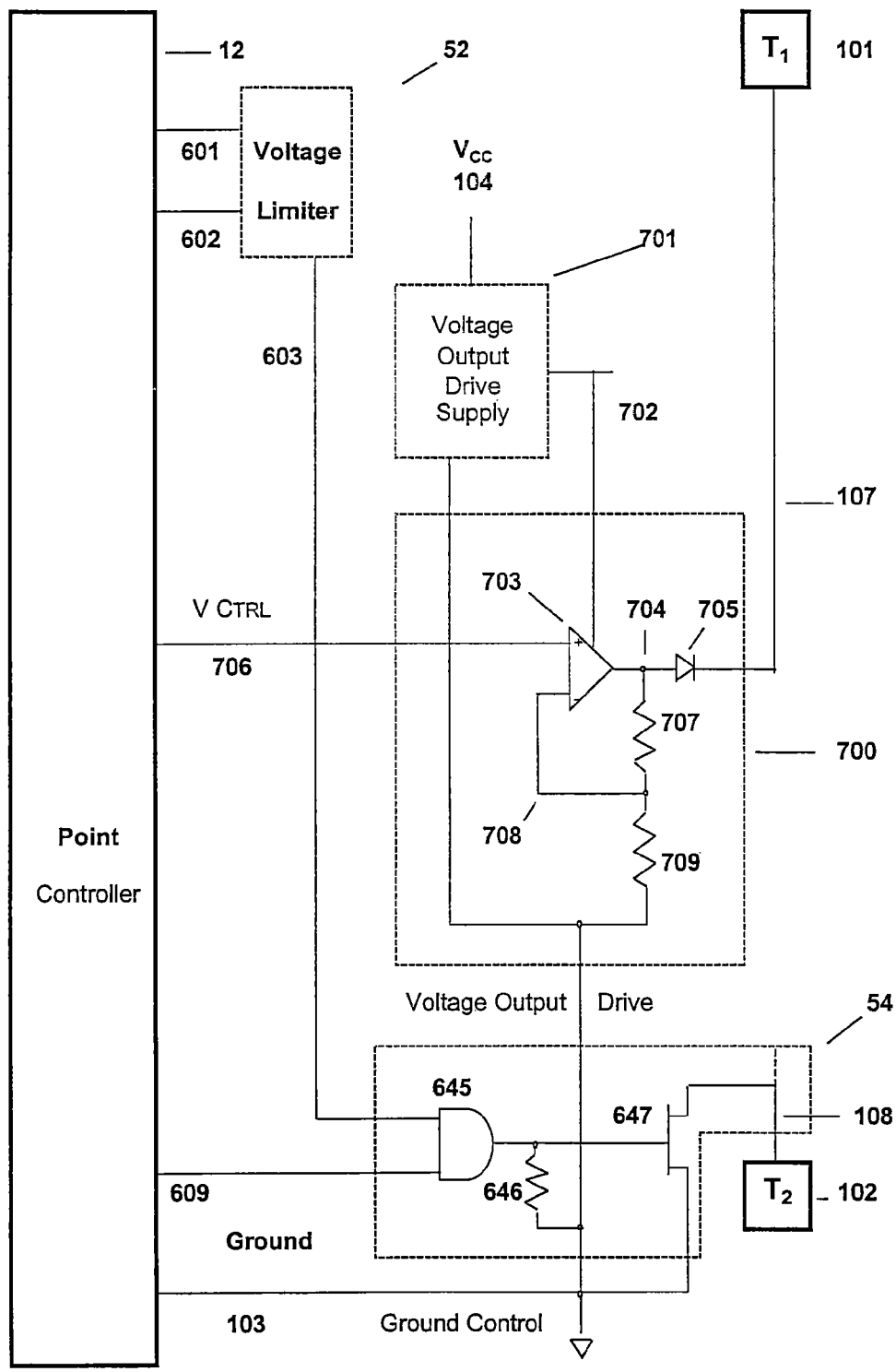
Figure {15} Mode 7: Analog Voltage Output

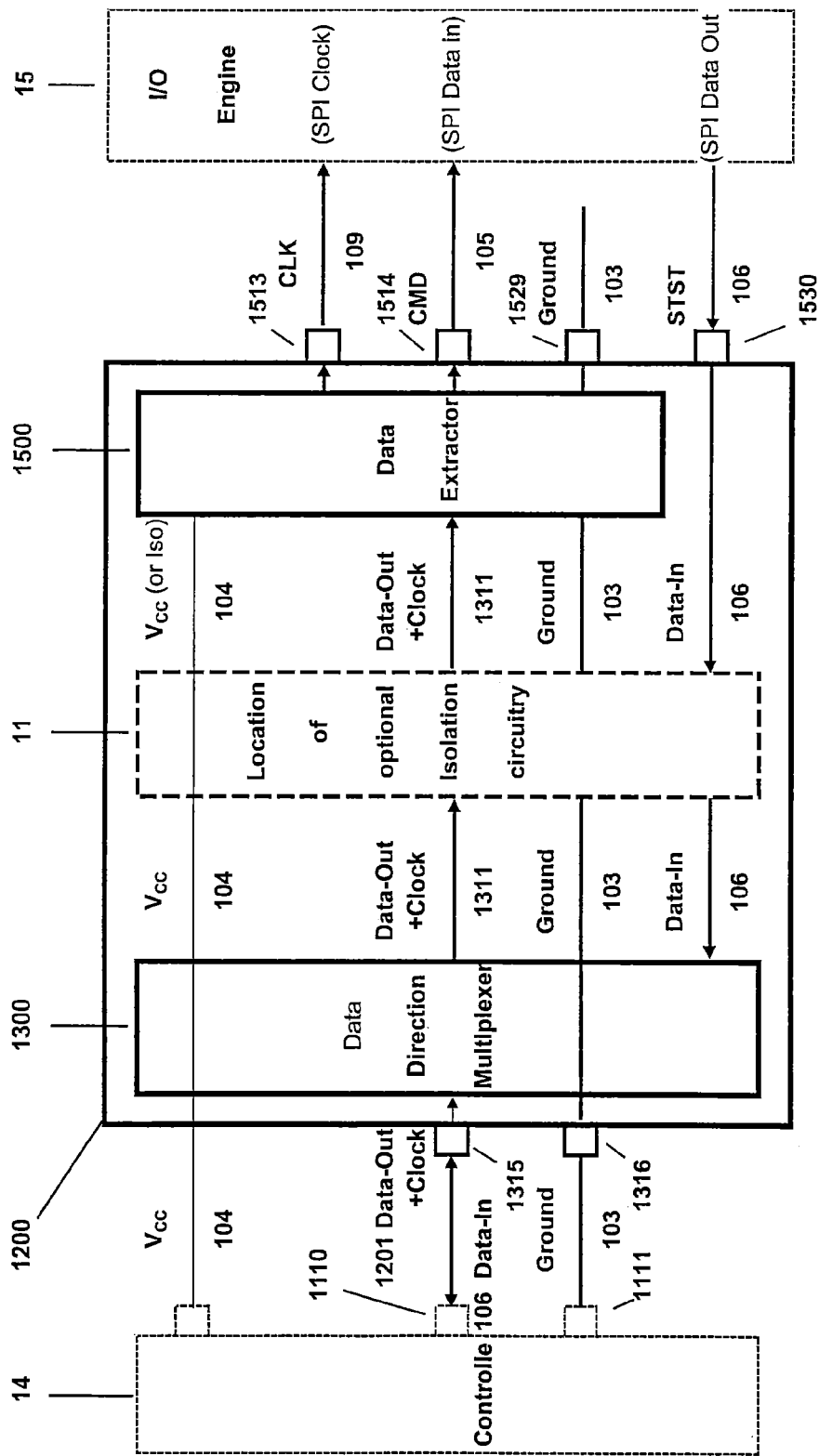
Figure 16 Monoline Serial Interface (SPI)

SYSTEM, DEVICE AND METHOD FOR COMPREHENSIVE INPUT/OUTPUT INTERFACE BETWEEN PROCESS OR MACHINE TRANSDUCERS AND CONTROLLING DEVICE OR SYSTEM

RELATED APPLICATIONS

This application is related to an claims the right of priority under 35 U.S.C. 119 and/or 35 U.S.C. 120 to U.S. Provisional Patent Application Ser. No. 60/220,545 filed 25 Jul. 2000 entitled System, Device, And Method For Comprehensive Input/Output Interface Between Process Or Machine Transducers And Controlling Device Or System; which application is hereby incorporated by reference in its entirety.

This application is related to co-pending U.S. Utility patent application Ser. No. 09/916,215 filed 25 Jul. 2001 entitled Apparatus, Method And Signal Set For Monoline Serial Interface; which application is hereby incorporated by reference in its entirety.

FIELD OF THE INVENTION

This invention pertains generally to systems, circuits, methods, and signals for interfacing an electrical or electronic component or a mechanical component or process generating or effecting an electrical or electronic signal to a control system or device; and more particularly to a single comprehensive universal input/output interface system, circuit, method, and signal set for interfacing such components and control systems that send or receive analog or digital voltage and/or current inputs and/or outputs over large voltage ranges of voltages and/or currents.

BACKGROUND

In automated processes or machines the controlling device monitors various sensors within the controlled process, evaluates the differences between the actual process state and the control algorithm requirements, and then activates appropriate process actuators. Conventionally, every automated system requires an individual electronic interface between a controller and each of the sensors and actuators of the process or machine being controlled. The sensing and actuating tasks are complex.

The sensor and actuator portion of the interface and interfacing task is complex and extensive at least in part because of the wide variety of voltages and currents such sensors and actuators encounter and therefore encode, interface with, and/or respond to. This problem became apparent at least since the 1969 development of the first general-purpose control device, the programmable logic controller (PLC). Conventionally, manufacturer's solution to the problem has been a series of compromises that do not favor the system designer or user.

There are four basic signal types for purpose of convenient description and analysis, they are: (1) analog inputs, (2) analog outputs, (3) digital inputs, and (4) digital outputs. The number of possible signal types is further compounded to include such characteristics as whether the signal is an ac (alternating current) signal or a dc (direct current) signal, whether it expresses logic levels (typically within the range of ±15 volts) or power line levels, whether the signal is fast or slow, and many ranges for analog sensors and actuators. Realistically there is a need to handle or interface over fifty different signal types for existing sensing, actuating, and control applications.

More usually, a manufacturer address the problem by limiting their standard products, for example, they may produce and market a subset of the ten to twenty interface blocks representing the most common signal types. This makes it necessary for the user requiring an interface circuit to use external signal conditioners to fill in voids for the less common signal types for which individualized blocks are not readily available commercially. Typically these plug-in signal conditioning blocks handle from one to sixteen I/O points of a single signal type.

This approach is not only expensive for the manufacturers to produce, document, market, stock, inventory and sell even the ten to twenty or so common different interface block types, but the designers who use them must select the appropriate type, and the controlled system user must maintain an inventory of essential spares so that spares are available for each type. The requirement to spare and service each type increases costs at the user end as well but not having an available spare of the correct type may mean shutting down a machine or process until a spare or repair is available, perhaps idling an assembly line and sending workers home at considerable cost.

The requirements for so many different signal interface block types also increase the risk that the wrong type will be used or will be miswired. This creates risk for personal and property damage.

There is also a need for a comprehensive interface component or circuit that provides for multiple analog voltage inputs that are switch or software/firmware programmable to support a range of analog voltage inputs extending from the micro-volt levels of thermocouple devices to high-voltage power ranges such as 220 VAC or higher.

Thus, there is a need for a universal or comprehensive interface that can handle more than one signal type or condition, or, where one cannot be designed or cost-effectively sold, for a fewer number of such comprehensive interface blocks that can handle classes or a plurality of signal types. There is also a need to provide such interfaces that reduce the risk of harm caused by miswiring. There is also a need for an interface that permits simultaneous sensing inputs and outputs.

There is also a need for a comprehensive interface component or circuit that provides combined inputs and outputs supporting these features rather than providing input and output in separate or piecemeal manner.

Thus, it is desirable to provide a comprehensive means to overcome the multiple deficiencies in order to simplify the design, manufacturing, and/or control of automated processes and machines.

SUMMARY

Comprehensive universal configurable interface for electrical, electronic, and electromechanical control, sensing, and actuation. Circuit, apparatus, and method for interfacing an electrical or electronic component or a mechanical component generating or effecting an electrical or electronic signal to a control system or device. Comprehensive universal input/output interface system, circuit, and method for interfacing such components and control systems that send or receive analog or digital voltage and/or current inputs over a large range of voltages and/or current without hardware or software switches.

One embodiment provides an electrical input and output (I/O) interface including a first port for coupling the interface to a first external device, a second port for coupling the interface with a second device, an operating circuit communicating with a first signal set at the first port and communicating a second signal set at the second port and performing an operation on one of the first signal set and the second signal set as an input and generating the other one of the first signal set and the second signal set as an output, and an operation selector selecting the operation performed by the operating circuit from among a plurality of operations.

In another aspect, the invention provides a method of interfacing a process or machine controller with a sensor monitoring a condition within the process or machine or an actuator acting to modify the process or machine with a controller receiving inputs from the sensor or sending commands to the actuator, where the method includes: coupling the sensor or actuator with first and second electrical terminals of an interface having a plurality of operation mode circuits providing different signal type input and output functions including a digital input function, a digital output function, an analog input function, and an analog output function; and controlling activation and deactivation of different ones of the operation mode circuits to provide a selected ones of the signal type input and output functions.

Embodiments of the invention provide a comprehensive universal electrical input and output interface and interface method between a controller (or other device) and the sensors and actuators or other transducers of a machine or process, used in monitoring, or monitoring and controlling the machine or process. In one embodiment, the inventive interface and method includes and needs only two terminals for the connection of sensor or actuator. It also includes a plurality of operation mode circuits to accomplish the following functions: digital input, digital output, analog input, analog output, and in some embodiments a combination of these functions. The inventive interface also supports either voltage or current input and output, and voltage and current capabilities over a broad range, such as from millivolts to hundreds of volts. These features may be provided in a single physical package for user configuration into a broad set of applications.

BRIEF DESCRIPTION OF THE FIGURES

The present invention will be described with reference to the accompanying figures which show exemplary embodiments of the invention for purposes of explanation and description and which are incorporated in the specification hereof by reference, wherein:

FIG. 1 is a diagrammatic illustration showing a top-level block diagram of an embodiment of an I/O Engine according to an embodiment of the invention.

FIG. 2 is a diagrammatic illustration showing Sensor-Actuator connections for representative input and output circuits.

FIG. 3 is a diagrammatic illustration showing structural and functional block elements utilized to perform the operations of a first mode operation (Mode 1: Digital (ON/OFF) Input) according to an embodiment of the invention.

FIG. 4 is a diagrammatic illustration showing structural and functional elements utilized to perform the operations of a second mode (Mode 2: Digital (ON/OFF) outputs) according to an embodiment of the invention.

FIG. 5 is a diagrammatic illustration showing structural and functional elements utilized to perform the operations of a third mode (Mode 3: Digital (ON/OFF) output load current input) according to an embodiment of the invention.

FIG. 6 is a diagrammatic illustration showing structural and functional elements utilized to perform the operations of a fourth mode (Mode 4: Milliamp Input) and fifth mode (Mode 5: Milliamp Output) according to an embodiment of the invention.

FIG. 7 is a diagrammatic illustration showing structural and functional elements utilized to perform the operations of a sixth mode (Mode 6: Analog voltage inputs) according to an embodiment of the invention.

FIG. 8 is a diagrammatic illustration showing structural and functional elements utilized to perform the operations of a seventh mode (Mode 7: Analog voltage outputs) according to an embodiment of the invention.

FIG. 9 is a diagrammatic illustration showing signals for an exemplary Point Controller according to an embodiment of the invention.

FIG. 10 is a diagrammatic illustration showing signals, states, and values for an exemplary Mode or Point Control Table for different operating modes according to an embodiment of the invention.

FIG. 11 is a diagrammatic illustration showing the individual circuit and logic elements for an exemplary implementation of a first mode of operation (Mode 1—Digital ON/OFF Input signals) according to an embodiment of the invention.

FIG. 12 is a diagrammatic illustration showing the individual circuit and logic elements for an exemplary implementation of second and third operating modes (Mode 2 and Mode 3) according to an embodiment of the invention.

FIG. 13 is a diagrammatic illustration showing the circuit and logic elements for an exemplary implementation of fourth and fifth operating modes (Mode 4 and Mode 5) according to an embodiment of the invention.

FIG. 14 is a diagrammatic illustration showing circuit and logic elements for an exemplary implementation of a sixth operating mode (Mode 6: Analog voltage inputs) according to an embodiment of the invention.

FIG. 15 is a diagrammatic illustration showing circuit and logic elements for an exemplary implementation of a seventh operating mode (Mode 7: Analog voltage outputs) according to an embodiment of the invention.

FIG. 16 is a diagrammatic illustration showing structural and functional elements of the MonoLine Serial Interface (SPI).

DETAILED DESCRIPTION OF SELECTED EMBODIMENTS

Various embodiments and features of the inventive system, apparatus, circuit, method, and signal set are now described relative to the figures.

With reference to the embodiment of the invention in FIG. 1, sensors 70, such as sensors installed in industrial processes or machines, provide external controllers 14, frequently computers, with the information (typically via analog or digital electrical signals) upon which to base control decisions that are subsequently implemented by actuators 72. Embodiments of the inventive input/output Engine (I/O Engine) 15 provides a universal electronic interface between a wide variety of sensors 70 and actuators 72 and sensor first and second pins, nodes, or connections 74, 75; and first and second actuator pins, nodes or connections 76, 77. Each of the sensors and actuators requiring only two terminals $T_1$ 101 and $T_2$ 102 of the I/O Engine interface.

Typically, the two terminals $T_1$ 101 and $T_2$ 102 of the I/O Engine interface see the serial combination of either or both sensor 70 in series with a voltage or current source 71, or actuator 72 in series with a voltage or current source 73. These are somewhat idealized models but suffice for describing the structure and operation of the inventive structure and method.

Controller 14 may typically use a conventional SPI (Serial Peripheral Interface) with a single connection each for receiving STAT 106 (status) information, sending CMD 105 (command) data and sending CLK (clock) 109, though other different signal sets or signaling schemes may be used. Note that signal CLK 109 is required only for the analog operations that use the Point-Controller 12, and is optional or not needed for other operations. Furthermore, in all but the simplest processes electrical isolation block 11 should be provided between the Controller 14 and the I/O Engine 15, though this is a safety and implementation derived requirement rather than a requirement of the invention of any embodiment of the invention. Isolation may conveniently be provided for the STAT 106, CMD 105, and CLK 109 signals using optical or magnetic components to provide the desired degree of isolation when utilized. Configuration data supplied by the Controller 14 selects which of the seven different modes of operation shown in FIG. 1 meet the requirements of the multitude of different characteristics of most sensors and actuators. Point controller 12 and point controller table values for selecting an operating mode are described in greater detail elsewhere in this specification relative to FIG. 9 and FIG. 10.

It is noted that in FIG. 1, data lines are conveniently illustrated as solid lines and control lines are illustrated as dashed or broken lines.

Although the modes are explained individually in the sections to follow, it is to be noted that in the inventive structures, circuits, and methods described herein, input modes for a given signal type can be used concurrently with their output modes. This makes it possible to read the actual output signal rather than the usual conventional method (and limitation) of reading the state of the output command register. The inventive structure and method thereby providing for reading the actual value not merely the commanded value.

Point-controller 12 which typically includes a microprocessor and analog input and output functions is required only for analog type input and output signals and may be eliminated or not used for other signal types. Furthermore, if only dc input and output signals are used, the bridge circuit 10 can be eliminated.

It will be appreciated that the embodiment of the I/O Engine 15 presented in FIG. 1 illustrates a comprehensive universal input/output interface that explicitly supports seven modes of operation. It will also be appreciated by those workers having ordinary skill in the art in light of the description provided herein that embodiments of the invention having only one mode, any combination of two or more modes, or all modes may be provided in any single device or interface block or package. For example, an I/O Engine 15 having only a Mode 1 (Input Digital ON/OFF) capability, only a Mode 2 (Output Digital ON/OFF) capability, only a Mode 3 (Output Digital ON/OFF Analog Amps) capability, only a Mode 4 (Input Analog milliamps) capability, only a Mode 5 (Output Analog milliamps) capability, only a Mode 6 (Input Analog Volts) capability, or only a Mode 7 (Output Analog Volts) capability, are contemplated by the invention although such embodiments would not provide the comprehensiveness of embodiments having additional operating mode capabilities. But, for example, an embodiment of the invention might for example provide for any one or more of Mode 1, Mode 2, and Mode 3 operation; or alternatively Mode 1, Mode 3, Mode 6, and Mode 7 operation. Elimination or deactivation of a particular circuit or set of circuits from a commercial device may permit manufacture and sale of such commercial device at a lower price where the set of operating modes needed by a customer is restricted. It will also be appreciated that while the embodiment of the I/O Engine illustrated in FIG. 1 shows separate functional blocks for each of the seven modes, that other embodiments of the invention may provide either for separate and distinct sets of circuits to provide the operating mode capability, or for shared sets of circuits and components where such sharing is technically feasible and of operational, cost, commercial, or other advantage.

Having now described various embodiments of the overall I/O engine and their interfaces to external sensors, actuators, and controllers, attention is now directed to a somewhat more detailed description of the sensor 70 and actuator 72 connections and to bridge circuit 10 which is utilized for some signal types in embodiments of the invention. In general, a bridge circuit such as bridge 10 is utilized in order that a single unidirectional circuit path is available to either monitor sensors or to control actuators. (Recall that in embodiments of the invention or applications where only dc input and output signals are used, the bridge circuit 10 can be eliminated.) While workers having ordinary skill in the art will appreciate that there are many bridge circuits as well as other non-bridge circuits known in the art that will provide the desired operation, the four diode bridge circuit 10 of FIG. 2 serves to illustrate the desired operation.

In this embodiment, diodes $D_1$ 201, $D_2$ 202, $D_3$ 203 and $D_4$ 204 of FIG. 2 make up a conventional full-wave bridge 10 that when excited by either an ac or dc voltage applied to its first and second input leads or terminals 107 and 108 will produce an output voltage signal output at output lead or terminal 110 that is positive with respect to a reference (such as ground reference) output lead 103. As in the general case, bridge 10 is utilized to provide a single unidirectional circuit path to either monitor sensors 70 or to control actuators 72.

Applications that sense a condition of sensor 70 are conveniently described as input applications and applications that control an actuator are conveniently described as output applications.

With input applications, a sensor 70, that can be as simple as a mechanical switch or as complex as a variable impedance, in series with a power source 71 produces a voltage or current that is applied to terminals $T_1$ 101 and $T_2$ 102. Resistor 130 is representative of the one or several current paths within operating modes and their corresponding circuits or logic 16 between signal 110 and reference or ground 103 causing a current 133 through the resistor (current path) 130. A current of the same magnitude 132 flows from terminal $T_1$ 101 via lead 107 to the Bridge 10 and also from the Bridge 10 through lead 108 to terminal $T_2$ 102. The direction of current 132 depends on the polarity of the signal applied from Sensor 70 and its power (voltage or current) source 71.

With output applications, an actuator 72, that can be as simple as a relay or as complex as a voltage or current actuated device (such as for example a proportional valve) in series with a power (voltage or current) source 73 energizes a voltage or current path that is applied to terminals $T_1$ 101 and $T_2$ 102. Variable resistor 131 is representative of the one or several current control paths within operating modes and their corresponding circuits or logic 16 between signal 110 and reference or round 103 causing a current 133, the magnitude of which is controlled by the equivalent resistance 131. A current of the same magnitude 132 flows from terminal $T_1$ 101 via lead 107 to the Bridge 10 and also from the Bridge 10 through lead 108 to terminal $T_2$ 102. The direction of current 132 depends on the polarity of the signal applied from actuator 72 and its power source 73.

A first mode of operation (Mode 1) is now described relative to the embodiment of the invention illustrated in FIG. 3. The first mode of operation, or Mode 1, involves digital inputs or inputs having a first or ON state or a second or OFF state.

These generally correspond to "0" and logic values and a corresponding signal that may be encoded in a variety of ways. For example, in terms of a low and high (or high and low) voltage level, a pulse or signal duration such as a pulse length modulation scheme, or other signaling schemes that are known in the art.

With further reference to FIG. 3, operation of bridge 10 generates an output signal 110 relative to a reference or ground signal 103, or where each line is considered differently, two output signals 103 and 110. Bridge circuit 10 may for example be the four-diode bridge circuit illustrated and described in FIG. 2, or any other circuit that performs analogous or equivalent signal processing or conditioning. This or these bridge output signals 103 and 110 serve as inputs to Level Detector 20 and Milliamp Common 40.

Receiving and reacting to bridge output signals 103 and 110, Milliamp Common 40 produces an output LV signal 111 that increases in magnitude as the current 133 through a low current detection circuit falls below its preset constant current value. In one embodiment, typically, the current 133 is on the order of about 1 mA or less, though larger currents may occur in other embodiments. Point-Controller 12 includes a digital-to-analog converter (DAC) that outputs a milliamp control signal (mACTRL) 429 (See FIG. 6) set in a tri-state mode that allows internal circuits to provide a low level constant current. This low level constant current may be used for the preset constant current value.

Low magnitude current detection advantageously makes it possible to evaluate the ON or OFF state of logic level signals (for example, logic level signals in about the ±3 to 15 volt range) and reduce the effects of voltage generated noise on the lines connected to terminals $T_1$ 101 and $T_2$ 102, as such lines may be maintained in a substantially current noise free state and it is difficult to induce current noise in such lines. Within Level Detector 20, low-voltage (LV) signal 111 is compared with a predetermined reference and produces a low-voltage state output signal (LV ON/OFF) 112 indicating the ON or OFF state of the low current path.

At a top-level, level detector block or circuit 20 receives signals from the input (and optionally through bridge 10 when required) and compares the received signal with one or more reference voltages to determine the voltage and/or current characteristics of the input signals, particularly whether the input falls within a high-voltage range or a low-voltage range. In some embodiments, the low voltage range may be a voltage magnitude between about 0 volts and 15 volts such as may be encountered for electronic circuit logic level signals, and a high-voltage may be a voltage for example greater than 24 volts, or greater than 100 volts.

In one embodiment, resistive voltage divider circuits or other circuits are used within the Level Detectors block 20 to both generate reference voltages and to attenuate the input signal in step-wise manner so that comparisons may be made using two-input comparators between reference voltages and attenuated signal voltages.

In one embodiment, three comparators are used for these voltage comparisons. A first comparator 216 generates a low-voltage on/off (Lv On/Off) signal 112 by comparing input LV signal 111 received from the current detector 42 section of milliamp control 40 with a first reference voltage 221. Second comparator 217 generates a high-voltage/low-voltage select signal (Hv/Lv Select) 113 by comparing an attenuated version of input signal 110 with a second reference voltage 222. The output of second comparator 217 provides output signal high-voltage/low-voltage select (HV/LV Select) 113 to Current-Voltage Selector 21. Third comparator 218 generates a high-voltage on/off signal (Hv On/Off) 114 by comparing the same attenuated input signal with a third reference voltage 223. The output of the third comparator 218 provides a high-voltage on/off output signal (HV ON/OFF) 114 to Ripple filter 22 and then on to Current-Voltage Selector 21.

For ac signals, the attenuated input as presented to third comparator 218 after being rectified by bridge 10, will vary from 0 volts to a peak voltage Vp volts and back to 0 volts. This causes the high-voltage on/off signal (Hv On/Off) 114 output to drop out for a portion of each ac signal cycle which dropout is removed by ripple filter 22.

Current Voltage-Current Selector 21 controls which ON/OFF signal, either low-voltage on/off (Lv On/Off) signal 112 or filtered high-voltage on/off signal (Hv On/Off) signal 242 (filtered high-voltage on/off signal (Hv On/Off) 114) is to provide the output STAT 106. Low-voltage on/off (Lv On/Off) signal 112 is presented at STAT when Hv/Lv Select 113 has not detected the presence of a high voltage. Filtered high-voltage on/off signal (Hv On/Off) signal 242 is provided at STAT 106 when Hv/Lv Select 113 has detected a high voltage input, this information is latched in current-voltage selector 21 and used to direct subsequent Hv ON/OFF data to STAT 106. Characteristics and operation of level detectors 20, current voltage selector 21, and ripple filter 22 are described in greater detail relative to the embodiment in FIG. 11 and elsewhere in this specification.

A second mode of operation (Mode 2) is now described relative to the embodiment of the invention illustrated in FIG. 4. This second mode of operation, or Mode 2, involves digital outputs or outputs having a first or ON state or a second or OFF state.

In this embodiment, Load Control block or circuit 33 provides a controllable means including circuit elements in one embodiment for controlling the completion of the current path connecting Terminals $T_1$ 101 and $T_2$ 102 as directed by a current control (ICTRL) signal 330 communicated from surge control block 32 to load control block 33. The Load Control 33 output signal, Load Current 122, is an electrical signal whose magnitude is proportional (or at least substantially proportional) to the current passing through Load Control 33 and terminals $T_1$ 101 and $T_2$ 102.

If Circuit Breaker circuit 31 determines, after a time delay, that the magnitude of Load Current 122 is greater than a predetermined acceptable limit, its output circuit-breaker OK signal (CBOK) 307 provides a circuit-breaker "tripped" or not OK state, and its complementary OK state.

CMD Control block or circuit 30 provides a surge control Enable signal 306 to Surge Control 32 when called for by command signal (CMD) 105 so long as Circuit Breaker 31 output signal CBOK 307 permits.

When enabled by Enable signal 306, Surge Control circuit 32 provides a time dependent changing level output current control signal (I CTRL) 330 to Load Control circuit 33. It can be shown that, the current passing through Load Control circuit 33 and terminals $T_1$ 101 and $T_2$ 102 is directly proportional to the magnitude of the current control signal (I CTRL) 330, thus providing the structure, method, and means for limiting the maximum load current, as well as provide the structure, method, and means for "time shaping" load current 33 during both turn-on and turn-off of loads in response to command (CMD) signal 105. Such "shaping" can desirable minimize current induced turn-on and turn-off EMI (electromagnetic interference) and RFI (radio frequency interference) with their related noise transients, and can also substantially reduce otherwise destructive mechanical and thermal shock to various actuators such as valves, motors and incandescent lamp loads. These structural, circuit, and method features therefore provide capabilities and advantages that are not available in conventional circuits, systems, or methods.

It is to be noted that the Mode 1 Digital Input functions can operate simultaneously with Mode 2 Digital Output.

A third mode of operation (Mode 3) is now described relative to the embodiment of the invention illustrated in FIG. 5. This third mode of operation, or Mode 3, involves digital output with load current input. Architecturally and from a circuit component standpoint, the Mode 4 configuration adds a point controller 12 to the structure already described relative to the embodiment in FIG. 4. Of course, the structure illustrated in FIG. 5 that includes the point controller may be used for Mode 2 operation by temporarily disabling the point controller or by ignoring its outputs.

Point controller 12 may for example be a microprocessor Type controller, such as the model ADµC812 made by Analog Devices of Massachusetts, USA. Functionally, point controller 12 is used in this embodiment to select which circuitry is active for a given mode and encode and decode analog values and other data to and from serial bit streams for communication with controller 14.

In Mode 3 operation, Point Controller 12 upon the receipt of a unique external command via a digital bit stream on command signal (CMD) 105, causes CMD Control block or circuit 30, via the Ana Select signal 120 to ignore any subsequently received direct signals via command signal (CMD) 105. The unique external command signal may be any signal recognized as being for this purpose. In this manner, only Point Controller 12 controls, via Local ON/OFF signal 115, the CMD Control block 30 output enable signal (Enable) 306. Other than these changes, other digital ON/OFF functions operate the same as already described relative to Mode 2 operation and the embodiment in FIG. 4, and is not repeated here. The external Controller 14 (See FIG. 1) coupled to the I/O Engine 15 through optional isolation 11, may retrieve the load current information from Point Controller 12 through a digital bit stream on status signal (STAT) 106.

Fourth and fifth modes of operation (Mode 4 and Mode 5) are now described relative to the embodiment of the invention illustrated in FIG. 6. This fourth mode of operation (Mode 4) involves determination of analog signal level proportional to current flow in the range of a few milliamps, and conversion of this signal level into a form suitable for transmission to the controller 14, and the fifth mode of operation (Mode 5) involves use of analog values conveyed from the controller 14 to control the output current, in the range of a few milliamps to one of a plurality of current flow rates proportional to the analog value.

For Mode 4, when an external current signal, of either polarity, is applied to terminals $T_1$ 101 and $T_2$ 102 of rectification or bridge circuit 10, bridge circuit output signal 110 will be positive with respect to ground 103 owing to the rectification provided by the bridge circuit. On basic electronic circuit principles, current flow between terminals $T_1$ 101 and $T_2$ 102 must pass through circuitry connecting signal 110 and ground 103. In modes 4 and 5, Milliamp Common 40 provides this path.

Milliamp Common 40 uses a digital-to-analog converter (DAC) output milliamp control signal (mACTRL) 429 provided by point-controller 12, to control the current flow from terminal $T_1$ 101 through bridge 10 to terminal $T_2$ 102. Point-controller 12, output milliamp control (mACTRL) 429 is at maximum for Mode 4 in order to cause FET 424 to its lowest resistance state, typically less than 100 ohms, so that the current between terminals $T_1$ 100 and $T_2$ is not affected. Milliamp Common 40 generates a voltage signal (mA) 430, which is proportional to this current flow, which is an input to an analog-to-digital converter (ADC) within point-controller 12, and is digitized to provide a serial bit stream output over status signal (STAT) 106 to controller 14.

In Mode 5, Point Controller 12, in response to a serial bit stream command from controller 14, generates a voltage signal mACTRL 429, having a plurality of levels proportional to the desired current flow. Circuitry within Milliamp Common 40 uses mACtrl 429 to control the current flow between terminals $T_1$ 101 and $T_2$ 102. During operation in Mode 5, the current between $T_1$ and $T_2$ may also be monitored as described for Mode 4.

A sixth mode of operation (Mode 6) is now described relative to the embodiment of the invention illustrated in FIG. 7. This sixth mode of operation involves analog voltage inputs.

Voltage signals, ac or dc, applied to terminal $T_1$ 101, complete a circuit path through Attenuators 51, and Ground Select 54 to Terminal $T_2$ 102. Attenuators 51 scales the applied input signal 107 from $T_1$ 101 based on the magnitude and type (ac or dc) of input signal 107. On or more attenuator control signals 603 (See FIG. 14 for an embodiment providing four attenuator control signals 604, 605, 606, and 607), allows point-controller 12, to configure various scaling factors for scaling the input signal to a value or value range that is suitable for input to an analog-to-digital converter (ADC). In this embodiment, the ADC input range is 0-2.5 volts. The scaled version proportional to the voltage between $T_1$ 101 and $T_2$ 102 is applied via signal 613 and 614 to an ADC within point controller 12 where its value is digitized and available as a serialized output over STAT 106, to for example, external controller 14.

Voltage Limiter 52, optionally but desirably provided, prevents component damage the I/O Engine in the event input signal 107 is greater than the range configured by point-controller 12.

Circuitry of Ground Select 54, an important element of the invention, via Ground Control lines 103, 608, and 609, under the control of Point Controller 12, selects the appropriate ground return based on signal range and type.

Ground select circuitry 54 selects the appropriate ground return based on signal range and type under control of point-controller 12, this feature provides significant advantages over conventional circuits and methods. Selection of an appropriate ground path is made via one or more ground control signals from point-controller 12 to ground select 54. A particular embodiment of the ground select circuit 54, one particularly advantageous aspect of the invention, is described in greater detail relative to the embodiment of FIG. 14.

A seventh mode of operation (Mode 6) is now described relative to the embodiment of the invention illustrated in FIG. 8. This seventh mode of operation involves control of analog voltage outputs.

With reference to FIG. 8, a digital-to-analog converter (DAC) that is part of Point-Controller 12 provides a voltage control signal (V CTRL) signal 706 to Voltage Output drive circuit 700 that provides analog output voltage via input/output interface lead 107 directly to terminal $T_1$ 101 and via ground select 54 and input/output interface lead 108 to terminal $T_2$ 102.

Concurrent with the Mode 7 operation, but not shown in FIG. 8 to avoid obscuring structures utilized for Mode 7 operation, Mode 6 operation may optionally but advantageously occur for the analog voltage input so that voltage is monitored and compensation may be provided to correct for errors that can occur in Voltage Output Drive 700.

Voltage Output Drive Supply circuit 701 provides the voltage level and current sufficient to meet analog output signal needs. Voltage Limiter 52 detects erroneously applied external voltages to terminals $T_1$ 101 and $T_2$ 102 and acts to disconnect, via Ground Select 54, any damaging current flow that might occur.

For each of the output modes corresponding input modes can be used simultaneously, specifically Mode 1 with Mode 2, Mode 4 with Mode 5 and Mode 6 with Mode 7. Within appropriate signal ranges different modes can be dynamically invoked sequentially.

Attention is now directed to description of some further embodiments of the invention, and in particular to some specific circuit implementations of the afore described point-controller 12 and of the Mode 1-Mode 7 configurations of the inventive comprehensive interface and input/output engine.

With reference to the diagrammatic illustration of an exemplary point-controller 12 in FIG. 9 and the Mode Control Table in FIG. 10, it is noted that point controller 12 provides structure, control, and other means for a single device to operate in any of the seven modes encompassing digital input and output and analog input and outputs. It allows selection of any one of these seven modes, on an individual point basis, at the discretion of the external controller 14. By on a "point basis" we mean that the type of signal used to interface individual sensors or actuators need not be the same for blocks of two or more sensors or actuators within the same system.

Point controller 12 has a plurality of digital outputs and inputs which provide for data flow to and from various components, including the selection of which components are active in a given mode. The point controller also provides a plurality of Digital-to-Analog Converters (DACs) and Analog-to-Digital Converters (ADCs) used by the various analog modes. It also includes circuits, lines, control, and other means of communicating with an external controller 14.

For a device which is to operate only in Mode 1 and/or Mode 2 involving digital input and/or digital output, point-controller 12 is not required, but as it may be deconfigured from active operation in the circuit, it may be provided in a single comprehensive interface package and ignored when not required for the intended operation.

A particular embodiment of a point-controller comprising an Analog Devices microcontroller Part No. ADµC812 60 and Analog Devices analog-to-digital converter Part No. AD7715 61 is now described relative to an exemplary embodiment in FIG. 9. Products made by other manufacturers having comparable features may alternatively be used and it will be understood by those workers having ordinary skill in the art that there are many alternative and equivalent commercial devices as well as custom devices and circuits that may be employed. The exemplary ADµC812 includes a microprocessor with digital I/O lines, a SPI interface, two 12 bit DACs and an eight channel 12 bit ADC.

The AD7715 61 used during Mode 6 and Mode 7 operation, is a 16 bit ADC with SPI interface and a Programmable Gain Amplifier (PGA). The PGA is particularly useful in reading any of several analog signal ranges.

In this particular embodiment, communications between the ADµC812 60 and the external controller 14 is via a SPI interface utilizing command signal (CMD) 105, status signal (STAT) 106 and clock signal (CLK) 109. This communications allows the external controller 14 to send commands that select which of the seven modes to configure, writes values for outputs, and reads values of inputs and outputs.

The ADµC812 60 contains a program that allows it to control its various I/O lines, DACs and ADCs as well as communicate with controller 14 and react to commands from the controller 14. The details of such a program are known in the art and not described in further detail here. Other microcontrollers than the ADµC812 may alternatively be used and provide similar or analogous features so that neither the invention nor any particular embodiment of the invention are limited to use of this particular microcontroller.

The point controller 12 uses a plurality of digital and analog signals that are summarized in FIG. 10 and described below.

Two ADC channels of the ADµC812 60 measure signals (mA) 430, of Modes 4 and 5, and load current (LdCur) 122 of Mode 3. The ADC in AD7715 61 is used to measure the scaled voltage 613 of Modes 6 and 7. Control of AD7715 by ADµC812 60 is via SPI bus leads ADC CLK 126, AD DI 127 and AD DO 128.

One DAC of ADµC812 60 provides the milliamp control (mACTRL) signal 429 of Modes 4 and 5. A second DAC provides voltage control signal (VCTRL) 706 for Mode 7 operation.

Digital I/O output lines 603, 604, 605, 606, 607, and 608 of ADµC812 60 are used to select circuitry used for various signal ranges of Modes 6 and 7. For other modes these signals are generally low to disable such circuitry.

The Ana Sel signal 115, another digital output line of ADµC812 60 when high, connects CMD 105 and STAT 106 directly to the circuitry used in modes 1 and 2. When AnaSel 115 is low, CMD 105 and STAT 106 are preempted for the exclusive use of ADµC812 60 for its own use in communicating with Controller 14.

In Mode 3, AnaSel 115 is low and Local ON/OFF is used to control the ON/OFF state of the external load. In Modes 4, 5, 6 and 7, where AnaSel 115 is also low, Local ON/OFF is low to turn off the current path used during digital output.

With reference to FIG. 11, attention is now directed to a further embodiment of a Mode 1 configured level-detector block or circuit, a top-level description of which structure and operation was provided relative to FIG. 3. This includes circuitry for the level detector 20, the current-voltage selector 21 and the ripple filter 22. The milliamp control 40 circuitry is shown separately in FIG. 13.

A network of four resistors 212, 213, 214, 215 connected in series between Vcc 104 and ground 103 provide first, second, and third reference voltages 221, 222, 223 for use in comparisons with input signal voltages by the first, second, and third comparators 216, 217, 218.

The ratio of resistors 210, 211 forming a voltage divider between first and second level detectors circuit 20 input signal 110 and ground 103 are chosen to limit the attenuated input signal voltage 220 between resistors 210, 211 to a value which will not damage the comparators with the highest level detector circuit input signal 110 voltage. The sum of resistances 210, 211 is chosen to be large enough to limit the current flow and power dissipation, as well as keeping the leakage current low enough to allow turning outputs off.

First comparator 216 generates a low-voltage on/off (Lv On/Off) signal 112 by comparing LV signal 111 with it's own first reference voltage 221. LV signal 111 is received from the current detector 42 section of milliamp control 40 that is shown separately in FIG. 13. As the potential of signal 110 becomes smaller, op amp output 111 increases in an attempt to maintain current 433 constant. The magnitude of signal 111 is used in the determination of the ON or OFF state of input signal 110.

Second comparator 217 generates a high-voltage/low-voltage select signal (Hv/Lv Select) 113 by comparing the attenuated signal 220 with it's own second reference voltage 222.

The reference voltage 222 of the second comparator 217 is based on the dividing level between typical ac input control signals (usually above 24 Vac) and lower levels logic signals (generally 15 Vdc and lower), of course any other dividing level may be selected to suit the particular application. So for example, a dividing level of for example 15 volts, 20 volts, 24 volts, or other appropriate voltage level may conveniently be selected. The output of the second comparator 217 provides output signal high-voltage/low-voltage select (FV/LV Select) 113 to CurrentVoltage Selector 21.

Third comparator 218 generates a high-voltage on/off signal (Hv On/Off) 114 by comparing the same attenuated signal 220 with its own third reference voltage 223 that is nominally half of second reference voltage 222. The output of the third comparator 218 provides output signal 1V ON/OFF 114 to Ripple filter 22 and then on to Current-Voltage Selector 21.

Current Voltage-Current Selector 21 controls which ON/OFF signal 112 or 242 (filtered 114) is to provide output STAT 106.

For ac signals, the attenuated input voltage signal 220 as input to comparator 218 after being rectified by bridge 10, will vary from 0 volts to a peak voltage Vp volts and back to 0 volts. This causes the high-voltage on/off signal (Hv On/Off) 114 output by third comparator 218 to drop out for a portion of each ac signal cycle. Ripple filter 22 has a resistor 240 and capacitor 241 that removes this dropout from signal 242 presented to the current-voltage selector circuit 21.

The current-voltage selector circuit 21 latches the high voltage state of the high-voltage/low-voltage select signal (Hv/Lv Select) 113 with a bistable flip-flop composed in one embodiment of NAND gates 230, 231, though other logic may alternatively be used. The NAND gate output signals 232, 233 are used to enable one and only one of the next pair of three-input NAND gates 234, 235, which in turn determine whether the low-voltage on/off (Lv On/Off) 112 or high-voltage on/off (Hv On/Off) 114 signal condition is reflected in the status (Stat) 106 output signal of the maControl block or circuit 40.

Each NAND gate 234, 235 has a third input AnaSelect 115, generated by the point controller 12. This allows the point controller 12 to disable both gates for other modes. When so disabled, Stat 106 is pulled high through resistor 237 to Vcc 104, allowing control of Stat 106 by the point controller. If a point controller is not present, AnaSelect 115 is pulled high through resistor 236 to Vcc 104, thus allowing either NAND gate 234 or 235 to be enabled.

This embodiment shows two thresholds for on/off determination, additional thresholds could be utilized by adding more comparators to the level detector 20 and additional gates to the current-voltage selector 21 as will be apparent to those skilled in the art.

A further embodiment and implementation of the digital output circuitry for Mode 2 and Mode 3 operation is now described with reference to FIG. 12. Also included is the generation of the Signal Load Current 122 used in Mode 3 operation. The optional output status signal (STAT) 106 is the same as previously described for Mode 1, and not repeated here.

Current practice in electronics typically utilizes either triacs or Field Effect Transistors (FETs) to control power level loads. Triacs mimic the characteristics of their mechanical counterpart, switches, they are either fully on or fully off; however, unlike conventional mechanical switches, can only control ac loads. After triacs are triggered or turned on, a minimum holding current is required to maintain them in an on state. This characteristic leads to two limitations in conventional practice that require correction for satisfactory operation in the present context.

First, triacs turn off for a short period of time during each zero crossing of the ac voltage signal because the current becomes less than the triac minimum holding value. This turn-off and subsequent turn-on at the ac line rate, gives rise to the generation of troublesome electromagnetic interference (EMI) that may require the use of filtering to remove or control the interference within acceptable limits. Second, driving devices loads (such as for example, solenoid controlled or activated valves in a controlled process or machine) whose current requirements are less than the triac's holding requirement necessitate the adding of power-wasting resistors in parallel with the load. In order to minimize the triac controlled turn-on surge current and minimize EMI, special "zero" crossing circuitry is used that enables turn-on only when the ac supply-voltage passes through zero.

Triac turn-off, with inductive (L) loads, produces inductive "kick", that is, L di/dt voltages, high voltages that can be sufficient to cause triacs to lose control. The addition of so-called "snubbing" resistive-capacitive (RC) networks is required to protect the switching device and to reduce the effects of EMI generated by the triac turn-off. Triac turn-off can generally only occur as its current approaches zero, which is not necessarily when the voltage approaches zero. Therefore, a triac turn-off time delay of up to one-half cycle from the zero voltage crossing of the ac power source will occur.

Power level loads may alternatively be controlled using power FETs. A power FET, a unipolar device, when used with the invention's Field Terminal Circuit 214, can control both ac and dc loads. FETs may be thought of as a voltage controlled resistor whose resistance is controlled by the FET gate-to-source voltage. Conventionally, the FET gate current is controlled with an ON/OFF signal and operation depends upon the inherent and so called constant-current characteristic of individual FETs to control surge current. It is known; however, that this so called constant-current FET characteristic typically varies from FET to FET and with operating temperature.

FETs controlled by ON/OFF switching signals are exposed to similar electrical problems as those arising when triacs are used, such as surge currents (or inrush), that can be very high at turn-on for inductive loads, as a consequence of their low dc resistance, and for incandescent lamp loads with their low cold temperature resistance.

A FET, which behaves as a variable resistor, may also be partially turned on to control the maximum current to values which are intermediate between the full ON and full OFF values. By controlling the current to slowly turn on and off the external load, undesired problems and conditions observed with conventional circuits and methods, previously described, are reduced.

In the embodiment of FIG. 12, FET 333 is a power FET with a very low $R_{DSon}$ (the minimum value of the drain-to-source resistance). FET 333 is able to carry high voltage currents, such as currents in the multi-ampere range.

Sense resistor 339, used to monitor or sense the load current, desirably has the lowest value practical in order to minimize its power dissipation when carrying large currents.

Operational Amplifier (Op Amp) 332, with its first and second biasing resistors 331, 334, are configured as a voltage follower loop controlling FET 333. This loop follows the voltage drop across Sense Resistor 339 which is proportional to the load current, and allows FET 333 to control the maximum current to a value proportional to current control (I CTRL) signal 330. This maximum current is, independent (or at least substantially independent) of operating temperature and characteristics of the FET.

Load control circuit 33 also includes Op Amp 336 which amplifies the voltage drop across load resistor to provide the Signal Load Current 122 at its output, which is in turn input to the circuit breaker circuit 31. In Mode 3 operation, the Load Current 122 is also input to the point-controller 12.

Circuit Breaker 31 monitors Load Current 122 as provided by Load Control circuit 33. This signal 122 is delayed by the Resistor 315 and Capacitor 316 to provide input signal 314 to Comparator 313. Comparator input signal 314 is compared to a voltage reference value 317 generated from the voltage divider consisting of first and second resistors 318, 319 between supply voltage Vcc 104 and Ground 103. When the current level, as reflected by comparator input signal 314, exceeds the reference voltage 317, the comparator output signal 312 of Comparator 313 sets the flip-flop 309 (composed of first and second NOR Gates 310, 311) to its tripped state. This in turn causes CMD Control circuit 30 via circuit breaker OK (CBOK) signal 307 to override the commanded ON state, ultimately causing the external load to be turned OFF.

Flip-Flop 309 (NOR gates 310, 311) will stay in this tripped state until Signal 308 from CMD Control 30 reflects a command OFF state. Output circuit breaker OK (CBOK) signal 307 will then reflect a non-tripped state allowing normal operation to resume.

The surge control circuit enable (Enable) signal 306 from CMD Control circuit 30 is either ON or OFF (asserted or deasserted). For a variety of reasons previously described and/or known in the art, suddenly turning ON or OFF the external load is undesirable. This is true for command changes of state as well as circuit breaker trips.

Surge Control 32, via the combination of capacitor 322 and resistors 320, 321, reshape the square wave of the Enable signal 306 into a current control (I CTRL) signal 330. This reshaped current control signal 330 has a slower rise and fall time owing to the signal conditioning in surge control 32. This signal, when applied by Load Control 33 allows full control of the rate of current change in the external load. A simple R-C network is shown, but more complex or different configurations can be implemented, using either alternative passive element topologies and/or using digital and/or analog outputs of point-controller 12.

In CMD Control 30, the combination of NAND Gates 302, 303 together with Inverter 301 and NOR Gate 304 allow a select signal to determine which of two signals CMD 105 from Controller 14 or Local ON/OFF 121 from Point Controller 12, control NOR Gate 304, NOR gate output signal 308, and ultimately affect or determine the ON/OFF state of the external load via Signal 110. It also includes NOR Gate 305 which allows Circuit Breaker 31 Output 307 to Override 308, thus allowing a tripped circuit breaker to turn OFF the signal at 306, and ultimately the external load, even though it would otherwise be ON. Signal 308, when in the output OFF state, also resets the Circuit Breaker 31, so that normal operation may resume.

With reference to FIG. 13, the central element of mA Control block or circuit is operational amplifier (op amp) 423 configured as a voltage follower with FET 424 and resistors 427 and 428 completing its negative feedback. By closed loop voltage follower action, operational amplifier output 111, applied to the gate of FET 424, causes voltage level 426 to be equal to operational amplifier input 422 with the result that a current 433 is equal to the voltage 422 divided by the sum of resistors 427 and 428.

It is to be noted that the magnitude of current 433 is constant and is independent of the applied signal voltage 110 so long as operational amplifier input 422 is equal to or larger than voltage 422. It is this characteristic that makes it possible to operate over a wide range of input signals 110 without the necessity of having to dissipate the power loss of voltage divider type of input circuits. Furthermore, because it is current rather than voltage that is being detected the effects of voltage induced electrical noise on input lines is significantly reduced.

As the potential of signal 110 becomes smaller, op amp 423 output signal 111 increases in an attempt to maintain current 433 constant. The magnitude of signal 111 is used in the determination of the ON or OFF state of input signal 110.

A flip-flop made up of NOR gates 411 and 412 driving the gate of FET 410 form the Current Limiter 41. On power-up, capacitor 413 and resistor 414 cause signal 431 to be high causing the output of NOR gate 412 to be low and in turn causing the resistance of FET 410 to be many megohms. Should signal 110 become so large that current 433 exceeds specified limits, voltage 415 will cause the flip-flop to change state with the result that the resistance of FET 410 approaches 100 ohms forcing signal 422 to near ground with the result that operational amplifier 423 output 111 will cause the resistance of FET 424 to its many megohm state that reduces and holds current 433 to a safe value.

Signal mA 430, a voltage signal across resistors 427 and 428, is proportional to the current 433 and is utilized in Modes 4 and 5. Signal mACTRL 429, an output of point controller 14, is utilized in Modes 4 and 5 and can over ride the magnitude of signal 422 established by the voltage divider action of resistors 420 and 421, that is used in Mode 1.

With reference to FIG. 14, Point Controller 12, via eight control lines 601 through 608, control all of the operations of Mode 6, the Analog Voltage In operating mode. (Other controllers may use a different number or different control lines, but it will be understood that the same or analogous operation may be achieved.) Control lines 607 and 608 in concert with Voltage Limiter output 609 enable AND gates 640 and 645 respectively, causing FETs 642 and 647 to their less than 100 ohm resistance states so that Terminal T₂ 102, Ground 103 and lead 613 between Attenuators 51 and Ground Control 54 are at the same electrical potential.

Point controller 12 control lines 603, 604 and 605 respectively via AND gates 620, 625 and 630 respectively cause FETs 622, 627 or 632 to be in their low less than 100 ohms resistance states. Attenuation of input signals, for inputs greater than full scale range of an ADC (analog-to-digital converter) that is part of Point controller 12, requires Control signal 606, via AND gate 635, to place FET 637 in its low resistance state and connect resistor 638 effectively to terminal T₂. Resistor 638 is part of a voltage divider made up of diode 624 and resistor 623 for ac voltages or resistor 628 for dc voltages. The resulting divided voltage 615 via resistor 660 and 613 that appears across resistor 638 and FET 613 are applied respectively as Voltage+ 614 and Voltage− 613 to an ADC (analog to digital converter) that is part of Point Controller 12. For low voltage inputs Attenuator 51 FET 632 is placed in its low resistance state and FET 637 is placed its multi-megohm state thus connecting thus allowing the input via resistor 660 to be applied directly to the ADC.

Transient protector 662 with resistor 660 protects the ADC from damaging high voltages If either of the input signals 615 or 613 exceed a limit determined by reference resistor network 652 and 656, the outputs 663 of Comparator 653 or 657 of Voltage Limiter 52 goes low setting the flip-flop made up of NAND gates 658 and 659 such that signal 601 via gate 650 will bring all FETs to their high resistance state and protect all circuits from damage.

The states of four Point controller 12 control lines 603 through 606 when enabled by Voltage Limiter output 609 determine the attenuation factor to be applied to analog input signals applied between terminals $T_1$ 101 and $T_2$ 102. For high voltage ac input signals, control line 603 places FET 622 in its less than 100 ohm resistance state.

With reference to FIG. 15, attention is now directed to an embodiment of the invention operating in Mode 7 for an analog voltage output situation. In the Voltage Output Drive circuit 700, operational amplifier 703 is configured as a voltage follower, by means of first and second resistors 707 and 709, causing operational amplifier output signal 704 to be directly related (by an amplification or multiplier factor) to op amp 703 non-inverting terminal input signal (V CTRL) 706. This multiplier relationship, a function of the ratio of the value of first resistor 707 to second resistor 709, and the output (both voltage and current) of Voltage Output Drive Supply 701 are determined by the full-scale output requirements of Mode 7, voltage output. Optional diode 705, desirably provided between operational amplifier 703 output 704 and terminal $T_1$ 101 via lead 107, prevents circuit damage should a reverse voltage be applied to terminal $T_1$ 101.

Ground Control circuit 54, whose AND gate 645 enabled by Voltage Limiter 52 output signal 603 and Point Controller 12 output signal 609, causes FET 647 to exhibit a resistance less than 100 ohms thus having the practical effect of bringing internal ground 103 to the same (or substantially the same) electrical potential as terminal $T_1$ 101. The function of optional Voltage Limiter circuit 52 and its output signal 603, is to protect circuitry from the potential effects of damaging high voltage applied by mistake between terminals terminal $T_1$ 101 and terminal $T_2$ 102.

With reference to FIG. 16 is a diagrammatic illustration showing the flow of bidirectional Data-Out and Data-In signals over a single conductor or line according to one embodiment of the invention.

Signal line 1201 from controller 14 tri-state I/O Port 1110 through the MonoLine Serial Interface 1200 to I/O Engine 15. The embodiment of the single or monoline serial interface FIG. 16 includes circuit, software/firmware, logic, or other means for the controller 14 to sequence a single I/O line port 1110 through the following states: (i) a low impedance output high, an active state, for transmitting data; (ii) a low impedance output low, an active state, for transmitting data, where the output low state can be held for a variable length of time dependent upon the output data a "1" or "0" for digital data or a plurality of values for analog data; (iii) return to output high to generate an edge which may be used as a SPI clock by the I/O Engine 15; (iv) high impedance input, a passive state for receiving data, which state will be maintained until the transmission of the next bit of output data. Sample the input data, interpreting its level as a digital "1" or "0".

The means for providing this sequence of states may, for example, be via a software driver using a standard tri-state I/O port, or by specific hardware which transfers data to and from registers containing one or a plurality of bits.

The single or monoline serial interface also includes a data direction multiplexer 1300, with a means to respond to the active and passive states, as seen at 1315 from signal 1201 allowing time alternate bi-directional transfer of information on a time-shared basis.

The active output 1201 seen at 1315 is latched such that data-out+clock 1311 is maintained at the last observed active output state, during the passive input state.

For Data-In STAT 106 to be returned to Controller 14 via 1201, the Data Direction Multiplexer must transform this signal to meet two requirements: First, it must be presented to 1201 with an impedance such that the I/O Engine 15 appears passive to active master output, but active to passive master input. Second, the data-in information must be presented to 1201 in such a way that it does not change the value latched for data-out+clock 1311.

The Data Direction Multiplexer 1300 achieves this by providing logic ahead of the latch such that the latch changes state only within two narrow signal ranges, one near Vcc 104 and the other near Ground 103. Signal levels between these two ranges, which represent valid high or low values to other logic, or valid analog levels, are in a dead band as seen by the latch and do not affect it. By modifying the values of data-in STAT 106, when different from latched data, to fall within this dead band, they can be presented to 1201 such that they are correctly seen by the Controller 14, but do not change the latch.

The data-out extractor 1500 extracts the data information from the data-out & clock 1311 and passes it to the I/O Engine 15. Data out as CMD 105 and clock as CLK 109. SPI hardware of the I/O Engine is configured to clock data-in and out on the clock trailing edge. When so configured, the data-in signal need only be in its correct state for a short period of time before and after the trailing clock edge.

Optionally, isolation circuitry 11, is placed between the data direction multiplexer 1300 and the Data-Out Extractor 1500. It electrically isolates Data-Out+clock 1311, Data-In 1503, VCC 104, and Ground 103. By so doing the I/O Engine 15 is completely isolated form the controller 14.

From the foregoing it will be appreciated that embodiments of the invention provide a comprehensive universal electrical input and output interface and interface method between a controller and the sensors and actuators or other transducers of a machine or process, used in monitoring, or monitoring and controlling the machine or process. In one embodiment, the interface includes only two terminals for the connection of sensor or actuator. It also includes a plurality of operation mode circuits to accomplish the following functions: Digital Input, Digital Output, Analog Input, Analog Output, and in some embodiments a combination of these functions. The inventive interface also supports either voltage or current input and output, and voltage and current capabilities over a broad range, such as from millivolts to hundreds of volts. Embodiments of the invention also provide means for controlling activation circuits for a given function and deactivate of other the others within a given function so that interfacing of a plurality of signal types is supported. In other aspects, the invention further includes means for an external controller to activate circuits for a given signal type and deactivate others.

In another aspect, the invention provides an interface that can monitor and return the actual state of output signals as opposed only their commanded status. This is advantageous as it provides a ready means for dynamically detecting while a process is under control that certain actuators are not operating as expected. It also provide a means for reducing installation and debugging time by detecting certain wiring or program errors, such as actual inputs being driven as outputs.

In another aspect, the invention provides interface that can limit damage to said interface as well as sensor or actuator as a result of miswiring or misconnection of the input terminals to other circuits or devices.

In still another aspect, the invention provides an interface with the means, by detecting input current rather than conventional input voltages, for detecting the state of a sensor that reduces the effects of induced electrical noise on lines connecting sensors to the universal interface.

In another aspect, the invention provides an interface with the means for measuring power, both real and imaginary, by dynamically switching between voltage and current measurements.

In still another aspect, the invention provides circuit, system, method, and means for controlling (not just limiting) load current, by providing constant current control, for power level actuators the manifestation of which: (a) can minimize the on-off mechanical shock to electromechanical solenoid valves; (b) can reduce electromagnetic (EMI) and RFA (radio frequency interference) caused by energizing, or de-energizing, inductive loads such as relays and solenoid valves thus reducing the need for circuits to suppress such effects; (c) can increase the speed of operation of inductive devices by driving them with a constant current; (d) can prevent the inherent low-resistance initial current loads of incandescent lamps from tripping circuit breakers; (e) can substantially increase the life of incandescent lamps by eliminating the initial thermal shock resulting from high initial turn on currents; (f) can reduce the destructive effects, both human and mechanical, of the so-called inductive "kicks" (actually −L di/dt) that occur when deenergizing inductive loads; and (g) minimizes the typical half-cycle time delay in energizing and de-energizing ac loads that occur with traditional triac control circuits.

In another aspect, the invention provides a single assembly or device, and as a result of a single assembly being able to monitor and control a wide variety of sensors and actuators, (that is a veritable one size fits all), to materially reduce the engineering time and cost required to design, purchase, assemble and debug the components of a system.

In another aspect, the inventive interface is provided in any of several industry standard physical and electrical connection configurations for retrofit replacement of conventional interface components.

The foregoing description, for purposes of explanation, used specific nomenclature to provide a thorough understanding of the invention. However, it will be apparent to one skilled in the art in light of the description provided that the specific details are not required in order to practice the invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

We claim:

1. A comprehensive interface circuit for simultaneously sensing input devices and output devices, comprising:

a first physical circuit package having a first electrical terminal, a second electrical terminal and a plurality of mode circuits disposed thereon, wherein said plurality mode circuits can accomplish digital input, digital output, analog input, and analog output, said first physical circuit package being electrically connected directly, exclusively, and physically to a single sensor or a single actuator, but not both simultaneously, via only said first electrical terminal and said second electrical terminal of said first physical circuit package, and said first electrical terminal and said second electrical terminal being capable of electrical communication with each of said plurality of mode circuits;

a second physical circuit package having a first electrical terminal, a second electrical terminal and a plurality of mode circuits disposed thereon, wherein said plurality mode circuits can accomplish digital input, digital output, analog input, and analog output, said second physical circuit package being electrically connected directly, exclusively, and physically to another single sensor or another single actuator, but not both simultaneously, via only said first electrical terminal and said second electrical terminal of said second physical circuit package, and said first electrical terminal and said second electrical terminal being capable of electrical communication with each of said plurality of mode circuits; and a controller that is external to said first physical circuit package and said second physical circuit package, said controller being capable of simultaneously receiving a condition from each sensor and being capable of simultaneously sending commands to each actuator.

2. The comprehensive interface circuit of claim 1, wherein each physical circuit package further has a point controller disposed thereon.

3. The comprehensive interface circuit of claim 1, further comprising an electrical bridge.

4. The comprehensive interface circuit of claim 1, further comprising a monoline serial interface.

5. The comprehensive interface circuit of claim 1, wherein said first physical circuit package is electrically connected to a single sensor and said second physical circuit package is electrically connected to a single actuator.

* * * * *